(12) United States Patent
Ohtsu

(10) Patent No.: US 11,013,342 B2
(45) Date of Patent: May 25, 2021

(54) CONVEYANCE SEAT AND SEAT COVER FOR THE SAME

(71) Applicant: TOYOTA BOSHOKU KABUSHIKI KAISHA, Aichi-ken (JP)

(72) Inventor: Hideki Ohtsu, Aichi-ken (JP)

(73) Assignee: TOYOTA BOSHOKU KABUSHIKI KAISHA, Aichi-ken (JP)

( * ) Notice: Subject to any disclaimer, the term of this patent is extended or adjusted under 35 U.S.C. 154(b) by 91 days.

(21) Appl. No.: 16/535,497

(22) Filed: Aug. 8, 2019

(65) Prior Publication Data

US 2020/0046137 A1 Feb. 13, 2020

(30) Foreign Application Priority Data

Aug. 9, 2018 (JP) .............................. JP2018-150576

(51) Int. Cl.
*A47C 31/02* (2006.01)
*B68G 7/12* (2006.01)
*B68G 7/052* (2006.01)
*B60N 2/58* (2006.01)

(52) U.S. Cl.
CPC ............ *A47C 31/02* (2013.01); *B60N 2/5883* (2013.01); *B68G 7/052* (2013.01); *B68G 7/12* (2013.01)

(58) Field of Classification Search
CPC ........ A47C 31/02; B60N 2/5883; B68G 7/12; B68G 7/052
See application file for complete search history.

(56) References Cited

U.S. PATENT DOCUMENTS

| | | | | |
|---|---|---|---|---|
| 3,671,984 A | * | 6/1972 | Ambrose | B60N 2/70 |
| 6,059,918 A | * | 5/2000 | Mingeishi et al. | B29C 3/02 156/293 |
| 2014/3785105 | * | 12/2014 | Okugawa et al. | B60N 2/58 297/452.18 |
| 2016/0375807 A1 | * | 12/2016 | Kageyama | B60N 2/58 297/452.61 |

FOREIGN PATENT DOCUMENTS

JP 63-196300 12/1988

* cited by examiner

*Primary Examiner* — Anthony D Barfield
(74) *Attorney, Agent, or Firm* — Greenblum & Bernstein P.L.C.

(57) ABSTRACT

A conveyance seat may include a seat pad, a first recess and a second recess formed in the seat pad. The first recess may have a pad-side engaging member disposed therein. The second recess may have no pad-side engaging member disposed therein. The conveyance seat may include a seat cover configured to cover the seat pad, the seat cover including a plurality of cover pieces, a first stitched portion and a second stitched portion projecting from the seat cover. At the first and second stitched portions, adjacent cover pieces may meet. The first stitched portion may have a cover-side engaging member configured to engage the pad-side engaging member. The second stitched portion may have no cover-side engaging member and may intersect with the first stitched portion at an intersection point. The conveyance seat may include a reinforcement member attached to the second stitched portion and bestriding the intersection point.

17 Claims, 18 Drawing Sheets

CONVEYANCE SEAT AND SEAT COVER FOR THE SAME

CROSS-REFERENCE TO RELATED APPLICATION

This application claims the benefit of Japanese Patent Application Serial No. 2018-150576 filed on Aug. 9, 2018 and entitled "CONVEYANCE SEAT," the content of which is hereby incorporated by reference in its entirety for all purposes.

BACKGROUND

The present disclosure relates to a conveyance seat including a seat pad defining an external shape of the conveyance seat and a seat cover configured to cover the seat pad. In such a conveyance seat, stitched portions of the cover pieces of the seat cover may be accommodated in recesses formed in the seat pad and may be partly attached thereto.

JPS 63196300 (U) discloses an automobile seat including a molded pad defining an external shape and a seat cover covering the molded pad. The molded pad may have a substantially rectangular shape when viewed from above and have substantially linear recesses formed on right and left sides thereof. The recesses are concave portions formed in a seat face of the molded pad. Within the recesses, insertion wires may be disposed. Each of the insertion wires may be integrated with the molded pad so as to extend along the corresponding recess. A portion of each insertion wire may be exposed from the bottom face of the corresponding recess. The exposed portion of the insertion wire can be used for fixing a portion of the seat cover in place.

The seat cover may be formed by stitching cover material pieces together. Stitched portions are formed on the back side of the seat cover where adjacent cover material pieces are mutually stitched together. At each of the stitched portions, margins of the adjacent cover material pieces protrude from the back side of the seat cover in an overlapping manner. A suspended cloth piece configured to maintain a wire therein may be attached to one of the overlapped margins. Furthermore, the seat face of the molded pad may be covered with the seat cover in a manner such that each of the stitched portions, which protrudes from the back side of the seat cover, is accommodated in a corresponding recess. Then, the wire maintained in the suspended cloth piece may be fixed to the insertion wire, which is partly exposed from the recess, using a hog-ring. Thus, a stable arrangement of each stitched portion in the corresponding recess can be achieved.

SUMMARY

Under the above-mentioned seat configuration, an insertion wire may not be arranged in some recesses because of the thickness of the molded pad (seat pad) or the depth of the recess. Accordingly, the suspended cloth piece and the wire (collectively referred to as a cover-side engaging member) may be omitted from the corresponding stitched portion. Under this configuration, however, this stitched portion, may adversely affect the appearance of the seat cover. For example, a stitched portion having no cover-side engaging member may rise from the recess since it does not receive a substantial fixing force. A portion of the seat cover where this rise occurs may become wrinkled, deteriorating its aesthetics. Additionally, when covering the molded pad with the seat cover, the seat cover may need to be bent and/or folded. This action may cause wrinkles to be formed in the seat cover near the stitched portion having no cover-side engaging member because the rigidity of such a stitched portion is relatively low. Accordingly, there has been a need for a conveyance seat that has a seat cover having a stitched portion that may lack a cover-side engaging member while maintaining the aesthetic appearance of the seat.

In one aspect of the present disclosure, a conveyance seat may include a seat pad, a first recess and a second recess formed in the seat pad. The first recess may have a pad-side engaging member disposed therein. The second recess may have no pad-side engaging member disposed therein. The conveyance seat may include a seat cover configured to cover the seat pad, the seat cover including a plurality of cover pieces, a first stitched portion and a second stitched portion projecting from the seat cover. At the first and second stitched portions, adjacent cover pieces may meet. The first stitched portion may have a cover-side engaging member configured to engage the pad-side engaging member. The second stitched portion may have no cover-side engaging member and may intersect with the first stitched portion at an intersection point. The conveyance seat may include a reinforcement member attached to the second stitched portion and bestriding the intersection point.

With this configuration, the reinforcement member may be attached to the second stitched portion, which receives less of a fixing force toward the pad-side engaging member. The reinforcement member effectively increases the rigidity of the second stitched portion, thereby preventing excessive rising of the second stitched portion from the second recess or bending in this direction. Thereby, the aesthetics of the second stitched portion can be improved. It is noted that the first stitched portion may be maintained in an intended position within the corresponding recess in a relatively stable manner, for instance by a fixing force that comes from an engagement of the cover-side engaging member and the pad-side engaging member. That is, the first stitched portion receives the aforementioned fixing force. Accordingly, the seat cover can be arranged on the seat pad in an aesthetic manner, even where the seat cover includes a stitched portion to which a cover-side engaging member is not attached.

The reinforcement member may be less flexible in a length direction than a width direction perpendicular to the length direction. With this configuration, excessive rising of the second stitched portion from the second recess can be avoided. Additionally, the reinforcement member can follow deformation (stretch and compression, for example) of the seat cover more smoothly, which contributes to improve aesthetics of the seat cover.

The reinforcement member may be longer in a length direction than in a width direction perpendicular to the length direction. With this configuration, the bending degree of the reinforcement member can be adjusted.

An overlapping portion of the reinforcement member may overlap a portion of the cover-side engaging member in a width direction of the reinforcement member. With this configuration, the second stitched portion can be disposed within the second recess in a more aligned manner with the first stitched portion.

The cover-side engaging member may be attached to a side of the first stitched portion opposite the overlapping portion (52A, 53A). With this configuration, the overlapping portion, which is arranged on the side of the second stitching margin, can maintain the upstanding state of the second stitched portion more stably.

DETAILED DESCRIPTION

Figure 1:
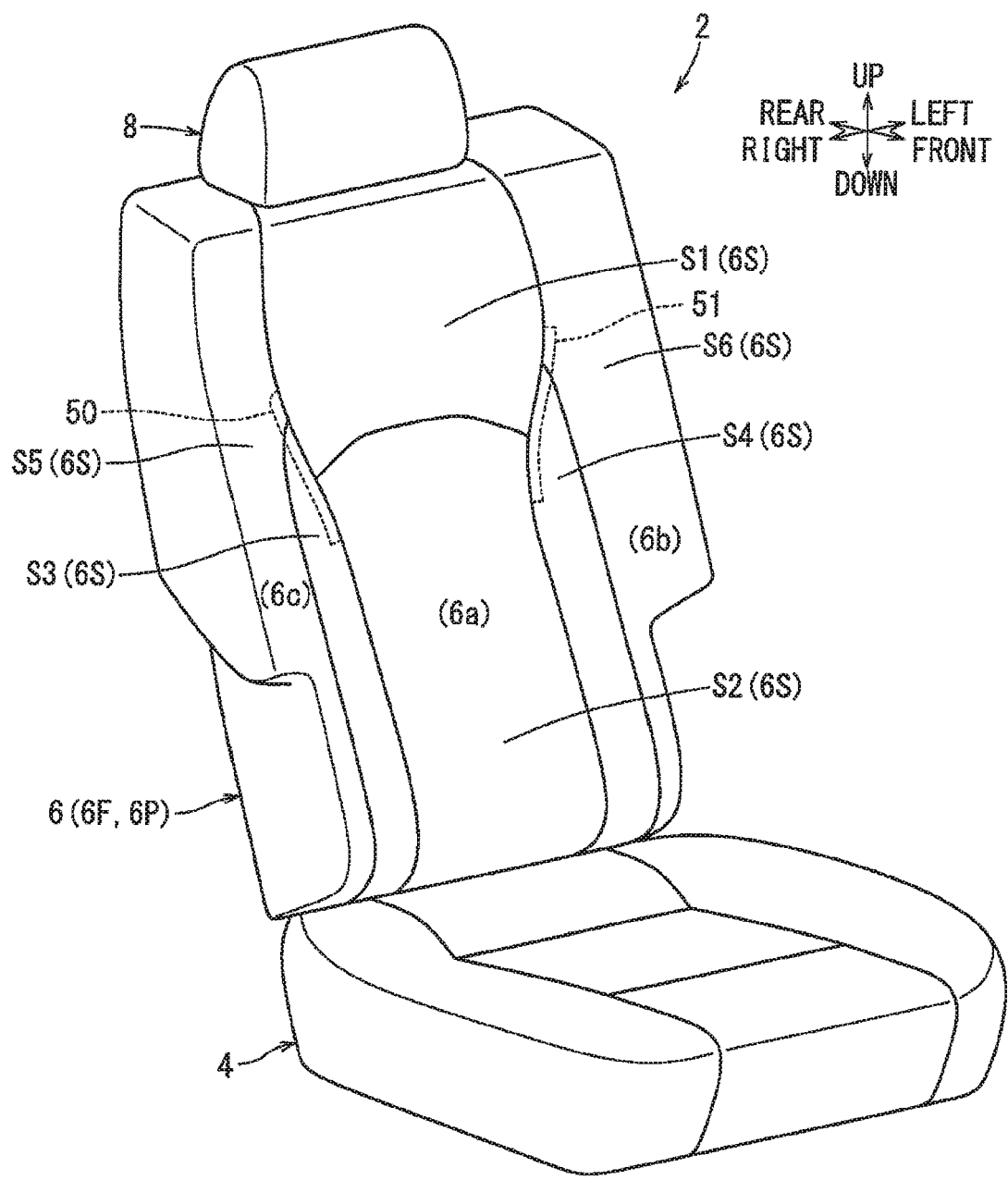
FIG. 1 is a perspective view illustrating a first embodiment of a conveyance seat.

Representative embodiments in accordance with principles described herein will now be described with reference to the drawings. For the purpose of illustration, some of the drawings includes one or more arrows pointing in the front and rear directions, left and right directions, and/or up and down directions. With regard to FIGS. 2 to 10 and 12 to 19, these arrows indicate an embodiment of an orientation of the seat components that have been assembled to constitute a conveyance seat 2. With regard to FIG. 6, reference numerals 50 and 51, denoting reinforcement members (described later), are provided at positions where the reinforcement members may be arranged, although other arrangements may be possible. Similarly, with regard to FIG. 15, reference numerals 52 and 53, denoting reinforcement members, are provided at positions where the reinforcement members may be arranged, although other arrangements may be possible.

FIG. 1 depicts a first embodiment of a seat back 6 of a conveyance seat 2. The conveyance seat 2 illustrated in FIG. 1 may generally include a seat cushion 4, a seat back 6, and a head rest 8. This seat back 6 may be a member that has a substantially rectangular shape and that forms a backrest. The basic configuration of the seat back 6 may include a back frame 6F (not depicted) that forms a framework of the seat back 6, a back pad 6P, and a back cover 6S. The back pad 6P and the back cover 6S, whose embodiments of various configurations will be described later, are examples of the seat pad and the seat cover of the present disclosure, respectively. A lower portion of the seat back 6 may be disposed on a rear portion of the seat cushion 4 such that the seat back 6 is capable of reclining relative to the seat cushion 4. The head rest 8 may be disposed on an upper portion of the seat back 6.

As illustrated in FIGS. 2 to 5, the seat back 6 may include, as components relevant to the above-mentioned basic configuration, a plurality of recesses 10 to 14, a plurality of pad-side engaging members 20, a plurality of stitched portions 30 to 36, a plurality of cover-side engaging member 40, and a pair of reinforce members 50, 51. Detailed configurations of these components will be hereinafter described. In this configuration of the seat back 6, the back pad 6P may be covered by the back cover 6S. Additionally, each of the stitched portions 30 to 36 may be accommodated in a corresponding recesses 10 to 14 formed in the back pad 6P. The cover-side engaging members 40, which are disposed at the stitched portions 30 to 34 in FIG. 5, may engage the pad-side engaging members 20, which are disposed in recesses 10, 12, and 14 in FIG. 2. The back pad 6P of the first embodiment may include the recesses 11, 13, each having no pad-side engaging member 20. The pad-side engaging members 20 may not be disposed in the recesses 11, 13 because of insufficient pad thickness or recess depth at these locations, for example. Since there are no pad-side engaging member 20 in these areas, cover-side engaging members 40 may also not be provided in these areas. Accordingly, the stitched portions 35 and 36 may not be anchored to the back pad 6P in these areas. However, reinforcement members 50, 51 may be positioned to correspond to portions of the stitched portions (e.g., stitched portions 35, 37, 36) that do not include the cover-side engaging member 40. Configurations of respective components will be described later.

Figure 2:
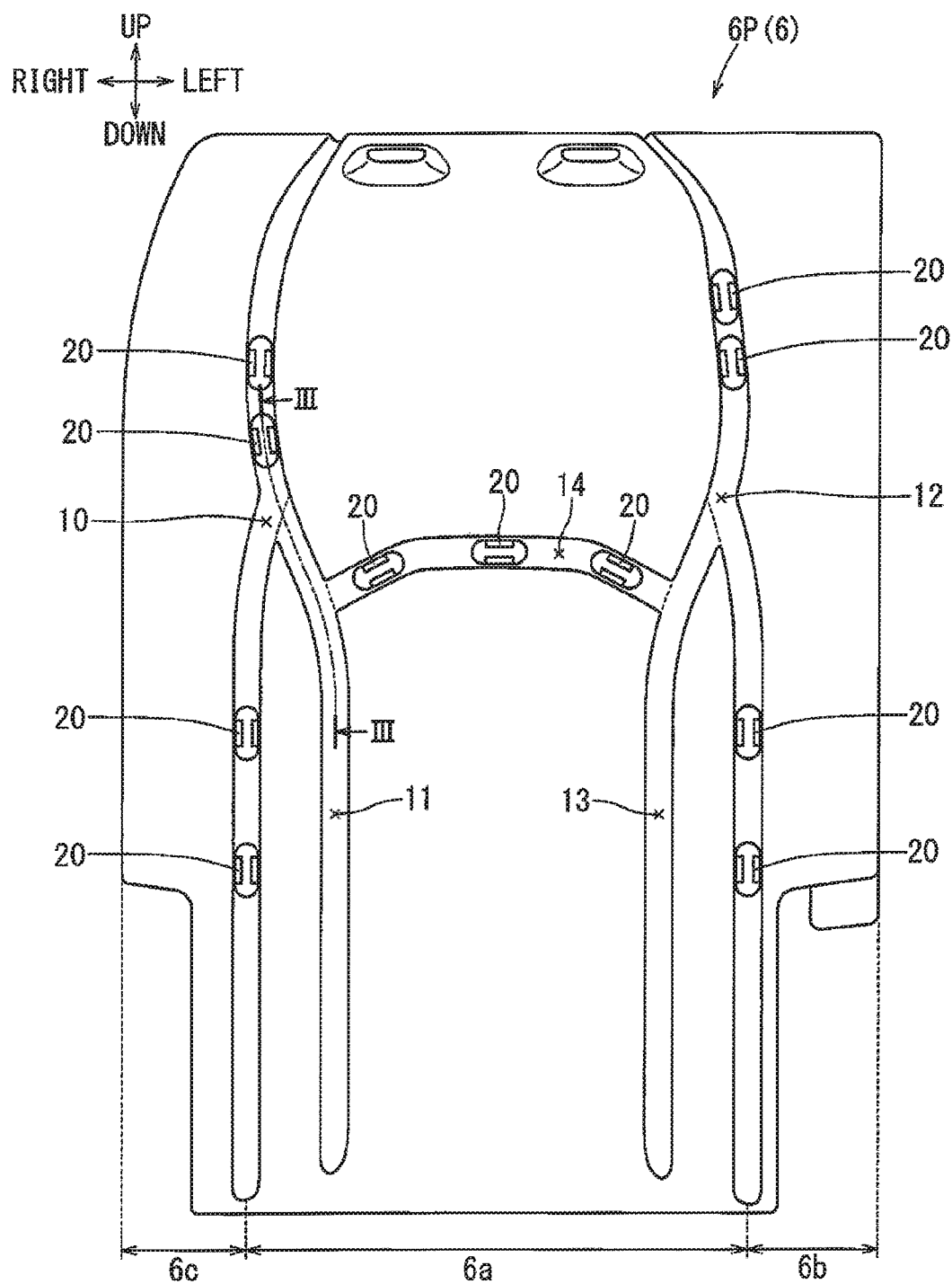
FIG. 2 is a front view illustrating a back pad of the conveyance seat illustrated in FIG. 1.

Here will be described the detailed configuration of the back pad 6P, as an example of an embodiment of the seat pad of the present disclosure. The seat back 6 illustrated in FIG. 1 may include a back frame 6F (not shown) and a back pad 6P that may be disposed on the back frame 6F. The back frame 6F may have a substantially rectangular or arch-like shape from a front view, and may be formed with a material with excellent rigidity, such as a metal or hard resin. The back pad 6P may essentially conform to an external shape of the seat back 6, as illustrated in FIG. 2. The back pad 6P may be formed of a foaming resin, such as a polyurethane foam (the density may be 10 kg/m$^3$ to 60 kg/cm$^3$). The front face of the back pad 6P is a surface with which a passenger may lean against with their back. The recesses 10 to 14, which will be described in detail later, may be formed on the front face of the back pad 6P. A seat back main part 6a, a seat back left-side part 6b, and a seat back right-side part 6c may collectively constitute the back pad 6P. The seat back main part 6a may be positioned in the middle of the seat back 6 in a seat width direction (e.g., in a left-to-right direction) and may extend in a seat height direction (e.g., in an up-to-down direction) having an appropriate width. Disposed on the right and left of the seat back main part 6a, respectively, are the seat back right-side part 6c and the seat back left-side part 6b, which bulge forward to a greater extent than the seat back main part 6a.

Here will be described the detailed configuration of the recesses 10 to 14, as an example of an embodiment of the recesses of the present disclosure. As illustrated in FIG. 2, the recesses 10 to 14 may be formed in the front face of the back pad 6P. The recesses 10 to 14 may include a first right-side vertical recess 10, a second right-side vertical recess 11, a first left-side recess 12, a second left-side vertical recess 13, and a lateral recess 14. The pad-side engaging members 20, which will be described later, may be disposed within one or more of the recesses 10 to 14. These recesses 10 to 14 may be substantially linear concave portions, each formed in the back pad 6P. Each of the recesses 10 to 13 has a width (e.g., the dimension in the left-to-right direction in FIG. 2) with such a size that a corresponding portion of the back cover 6S, which will be described later, can be located therein in a pulled manner. Similarly, the lateral recess 14 may have a width (e.g., the dimension in the up-to-down direction in FIG. 2) with such a size that a corresponding portion of the back cover 6S can be located therein in a pulled manner.

Figure 3:
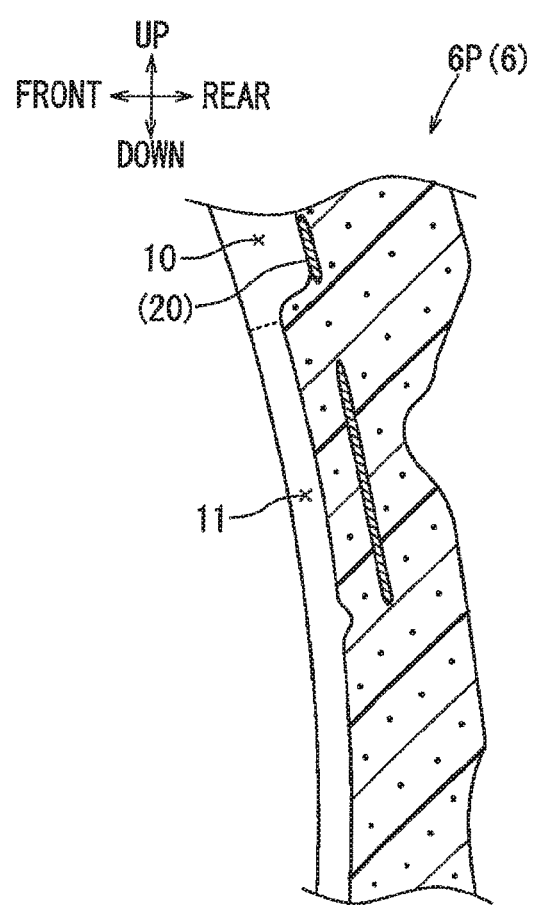
FIG. 3 is a cross-sectional view of the back pad, the cross section being taken along line III-III of FIG. 2.

The first right-side vertical recess 10 illustrated in FIG. 2 may be formed between the seat back main part 6a and the seat back right-side part 6c, the first right-side vertical recess 10 extending in the up-to-down direction. Similarly, the second right-side vertical recess 11 may be formed on a lower right portion of the seat back main part 6a, the second right-side vertical recess 11 extending in the up-to-down direction. The upper portion of the second right-side vertical recess 11 may curve rightward and an upper end thereof may connect with the middle of the first right-side vertical recess 10. Each of the first left-side vertical recess 12 and the second left-side vertical recess 13 may be formed so as to be symmetrical with the corresponding right-side recess 10, 11. The first left-side vertical recess 12 may be formed between the seat back main part 6a and the seat back left-side part 6b, the first left-side vertical recess 12 extending in the up-to-down direction. Similarly, the second left-side recess 13 may be formed on a lower left portion of the seat back main part 6a, the second left-side recess 13 extending in the up-to-down direction. The upper portion of the second left-side vertical recess 13 may curve leftward and an upper end thereof may connect with the middle of the first left-side vertical recess 12. The lateral recess 14 may extend along the left-to-right direction at substantially the central portion of the seat back main part 6a in the up-to-down direction. The lateral recess 14 may have an upwardly convex curved shape. The right-side end of the lateral recess 14 may be connected with an upper portion of the second right-side recess 11. Similarly, the left-side end of the lateral recess 14 may be connected with the upper portion of the second left-side recess 13. As illustrated in FIG. 3, the back pad 6P of the present embodiment becomes relatively smaller in thickness, that is becomes thinner, at the upper portion of the second right-side vertical recess 11. For example, the back pad 6P becomes thinner at the portion of the second right-side vertical recess 11 near the first right-side vertical recess 10. Similarly, the back pad 6P becomes relatively thinner in the vicinity of the upper portion of the second left-side vertical recess 13 illustrated in FIG. 2.

Figure 10:
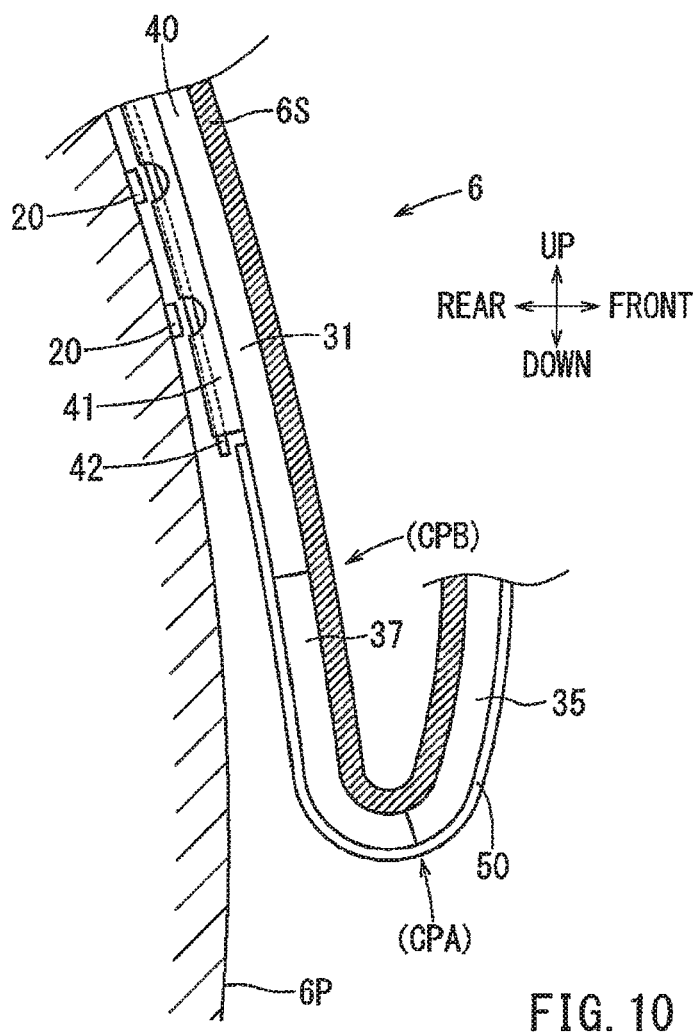
FIG. 10 is a schematic sectional view illustrating a seat back of the conveyance seat illustrated in FIG. 1 during a covering operation of the back cover illustrated in FIGS. 4 to 8.

Here will be described an embodiment of the pad-side engaging members 20, as an example of the pad-side engaging member of the present disclosure. The pad-side engaging members 20 illustrated in FIGS. 2 and 10 are members each being capable of engaging a corresponding cover-side engaging member 40. For the sake of simplicity, the pad-side engaging members 20 each have a common reference numeral of 20. In the present embodiment, as illustrated in FIG. 2, there is no pad-side engaging member 20 disposed within the second right-side vertical recess 11 and the second left-side vertical recess 13, both of which are formed on a thinned portion of the back pad 6P. On the other hand, pad-side engaging member(s) 20 are disposed within each of the remaining recesses 10, 12, 14, which each have an appropriate thickness. For example, pairs of pad-side engaging members 20 may be disposed within an upper and lower portion of the first right-side vertical recess 10. Here, the upper portion is located at a position above an intersection of the first right-side recess 10 and the second right-side vertical recess 11, while the lower portion is located at a position below the intersection. The two pad-side engaging members 20 constituting each pair are arranged at an appropriate distance between each other. Similarly, a plurality of pad-side engaging members 20 may be disposed within the first left-side vertical recess 12 so as to be symmetrical with the pad-side engaging members 20 disposed within the first right-side vertical recess 10. Also, three pad-side engaging members 20 may be disposed within the lateral recess 14. These pad-side engaging members 20 may be arranged with substantially an equal distance therebetween in the left-to-right direction. The pad-side engaging members 20 may each have substantially identical basic configurations and may be incorporated into the back pad 6P by any appropriate method, for example insert molding. Each of the pad-side engaging members 20 may have a plate (not labeled) embedded within a bottom wall of a corresponding recess. The plate may have a substantially rectangular shape when viewed from the front view. Each pad-side engaging member 20 may also have a claw (not labeled) protruding from the plate. Each claw may be capable of holding a wire of a corresponding pad-side engaging member 40, which will be described later.

Here will be described an embodiment of the back cover 6S, as an example of the seat cover of the present disclosure. The back cover 6S illustrated in FIGS. 1 and 4 to 6 may be a cloth constituting an aesthetic face of the seat back 6. The back cover 6S may include a plurality of pad-side engaging members 40 and a pair of reinforcement members 50, 51. The back cover 6S depicted in FIG. 1 may be formed by stitching a plurality of cover pieces, such as including cover pieces S1 to S6, into a bag shape that is capable of covering the back pad 6P. In FIG. 1, only certain cover pieces are provided with reference numerals, while the other cover pieces are not labeled.

Figure 4:
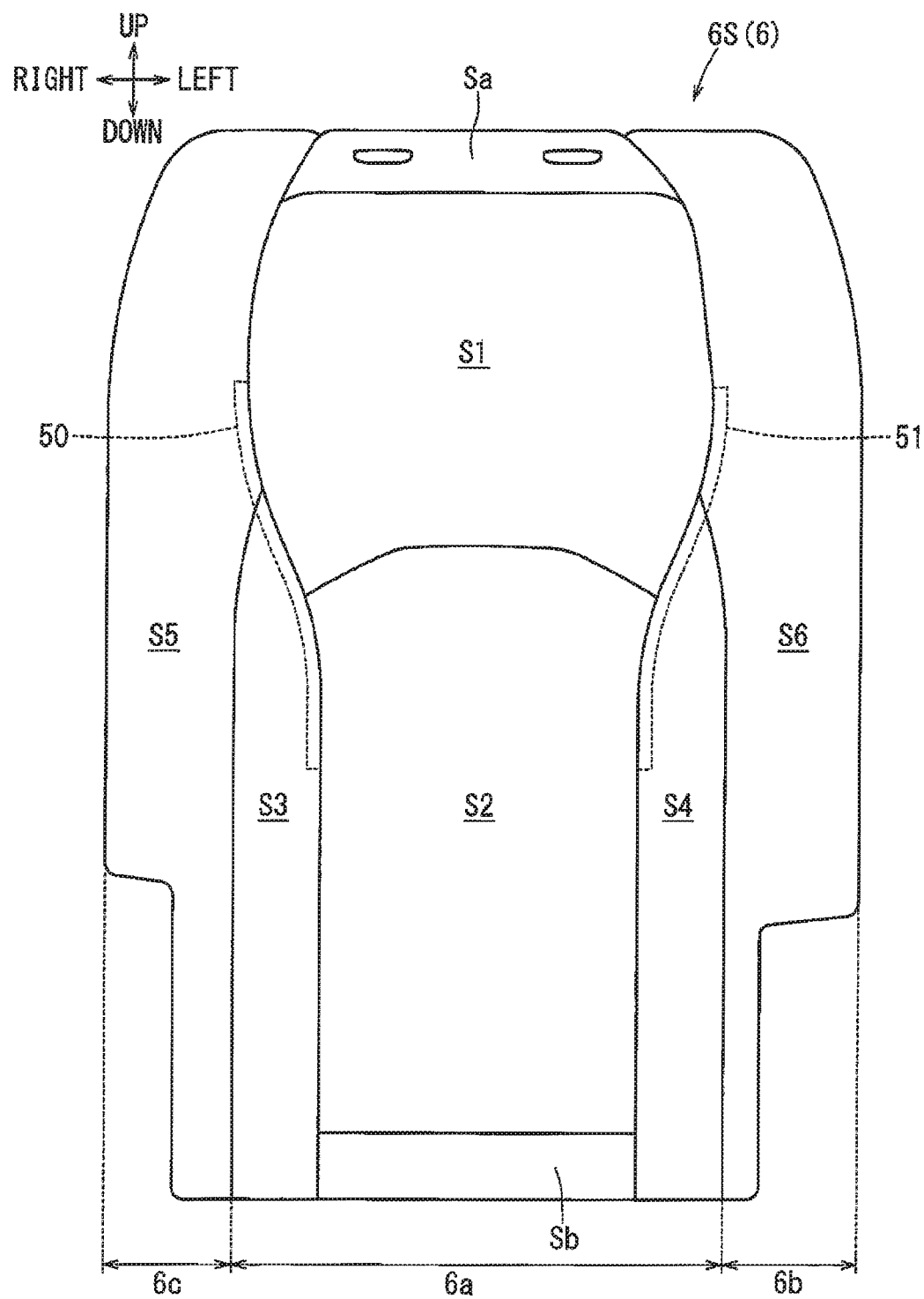
FIG. 4 is a front view of a back cover covering the back pad of the conveyance seat illustrated in FIG. 1.
Figure 6:
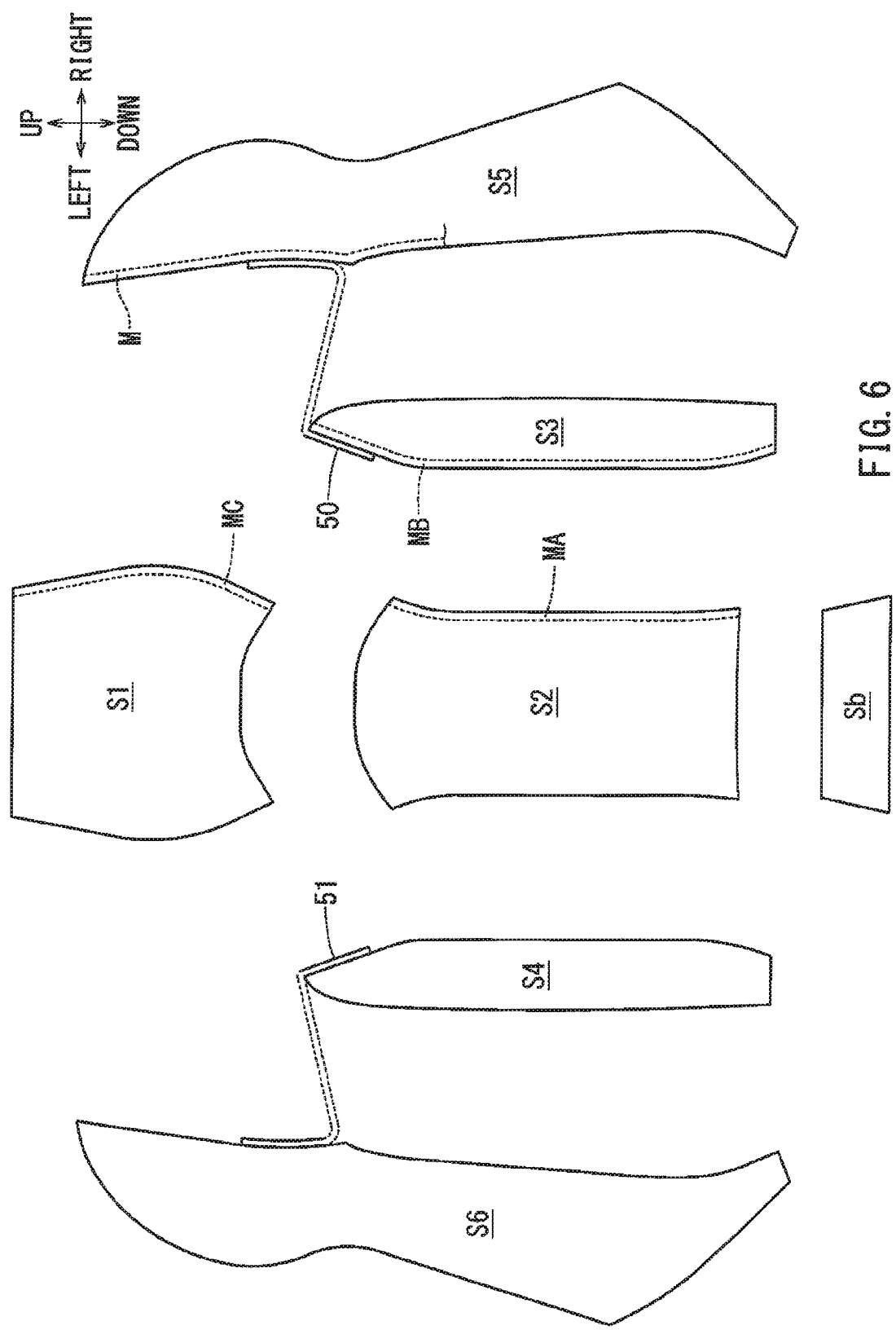
FIG. 6 is a developed view illustrating the cover pieces constituting the back cover illustrated in FIGS. 4 and 5.

As shown in FIGS. 4 and 6, the front face of the back cover 6S may be roughly divided into a plurality of main cover pieces S1 to S4, a right-side cover piece S5, and a left-side cover piece S6. A wide variety of materials may be optionally selected and used for each cover piece S1 to S6. Examples of cloth materials includes, but is not limited to: fabrics such as a web, knit, or non-woven cloths; or leather such as natural leather or artificial leather. It is possible that a pad material, for example a polyurethane laminate or a backing made of non-woven cloth, may be arranged on the back face of each cover piece S1 to S6 so as to be integrated thereto. The right-side cover piece S5 may be a cover piece covering the seat back right-side part 6c. Similarly, the left-side cover piece S6 may be a cover piece covering the seat back left-side part 6b. The right-side cover piece S5 and the left-side cover piece S6 may have a symmetrical shape in the left-to-right direction and may have an elongated rectangular shape when viewed from the front view.

Each of the main cover pieces illustrated in FIGS. 4 and 6, namely, an upper-side main cover piece S1, a lower-side main cover piece S2, a right-side main cover piece S3, and a left-side main cover piece S4, are cover pieces covering the seat back main part 6a. The depicted upper-side main cover piece S1 is a cover piece covering an upper portion of the seat back main part 6a, and has a substantially rectangular shape whose bottom edge curves in an upward convex manner. Additionally, a lower portion of the upper-side main cover piece S1 gradually becomes smaller in dimension in the left-to-right direction, e.g. in the width direction, toward the lower end. Stitched to an upper end portion of the upper-side main piece S1 may be an upper-end cover piece Sa, which can cover an upper portion of the back pad 6P. The lower-side main cover piece S2 may be a cover piece that has a rectangular shape and whose upper end curves in an upward convex manner. An upper portion of the lower main cover piece S2 may be stitched to a lower end portion of the upper-side main cover piece S1. An upper portion of the lower-side main cover piece S2 may become wider in the upward direction and may gradually bulge toward both the right and left ends thereof. A lower end portion of the lower-side main cover piece S2 may be stitched to a lower-end cover piece Sb, which has a rectangular shape in a front view.

As illustrated in FIGS. 4 and 6, the right-side main cover piece S3 may be stitched to a lower portion of the upper-side main cover piece S1 and to the lower-side main cover piece S2, from the right of these main cover pieces S1, S2. Similarly, the left-side main cover piece S4 may be stitched to a lower portion of the upper-side main cover piece S1 and to the lower-side main cover piece S2, from the left of these main cover pieces S1, S2. The right-side cover piece S3 and the left-side main cover piece S4 may be arranged so as to be symmetrical in the left-to-right direction, with both main cover pieces S1 and S2 being arranged therebetween at the center of the back cover 6S. The right-side main cover piece S3 may be a substantially rectangular cover piece elongated in the up-to-down direction. The right-side main cover piece S3 may be configured to cover a lower and right portion of the seat back main part 6a. An upper portion of the left edge of this right-side main cover piece S3 may gradually incline rightward while extending upward, so as to follow the right edge feature of each main cover piece S1, S2. Similarly, the left-side main cover piece S4 may be substantially a rectangular cover piece elongated in the up-to-down direction, the left-side main cover piece S4 covering a lower and left portion of the seat back main part 6a. An upper portion of the right edge of this left-side main cover piece S4 may gradually incline leftward while extending upward, so as to follow the left edge feature of each main cover piece S1, S2.

Figure 5:
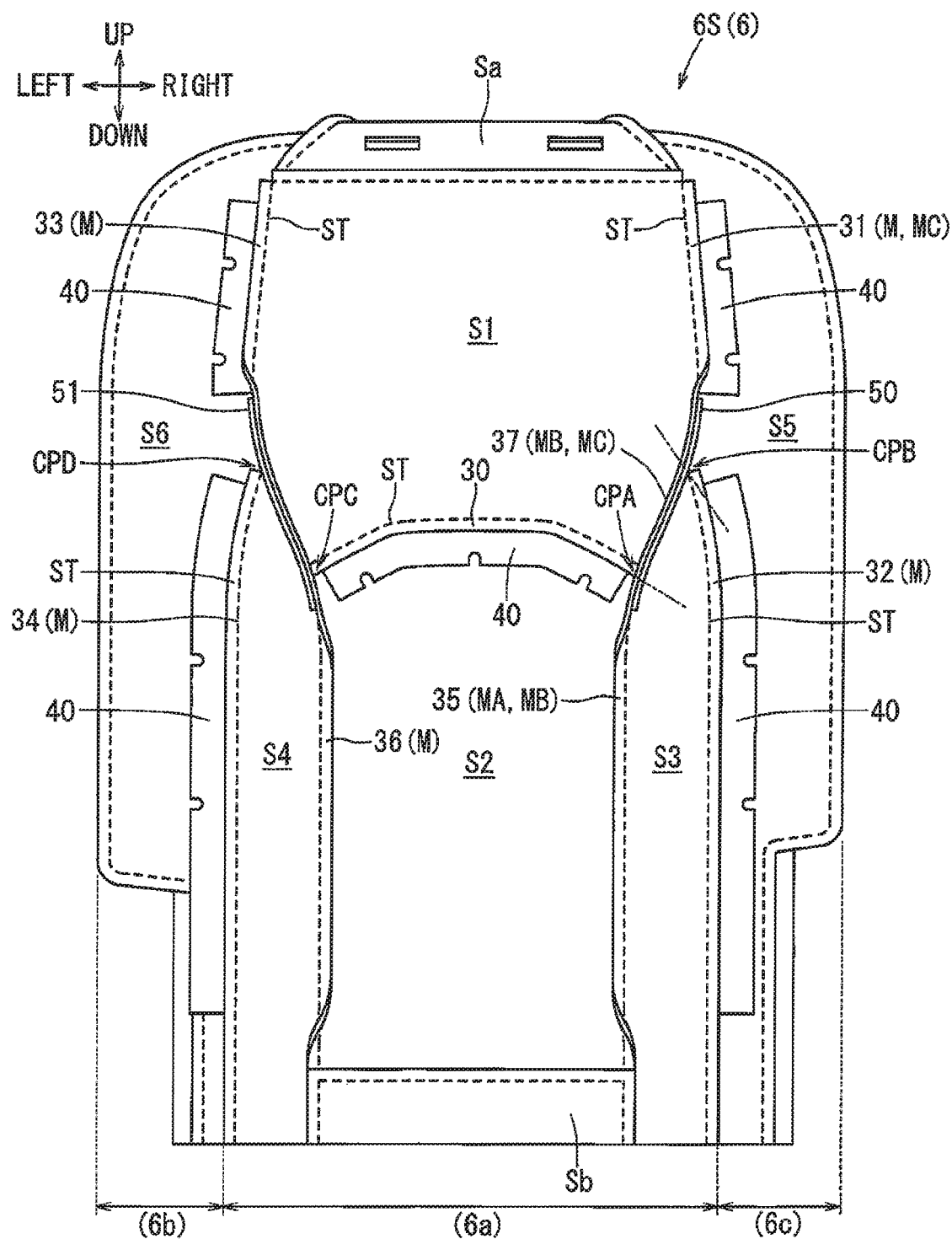
FIG. 5 is a rear view of the back cover illustrated in FIG. 4.

Here will be described an embodiment of the stitched portions 30 to 37 and stitching margins MA, MB, MC, M, as an example of the stitched portions and the stitching margins, respectively, of the present disclosure. As illustrated in FIG. 5, the stitched portions 30 to 37 are formed on the back cover 6S. Each stitched portion 30 to 37 may be a stitched portion where a corresponding pair of mutually adjacent cover pieces is stitched. Portions of corresponding pairs of mutually adjacent cover pieces of each stitched portion 30 to 37 may protrude from the back side of the back cover 6s in an overlapping manner. For example, each stitched portion 30 to 37 may include the seam allowances of two adjacent cover pieces stitched together. In FIG. 5, for sake of simplicity, while certain stitching margins (e.g., seam allowances) are provided with a reference numeral MA, MB, MC, the rest of the stitching margins are provided with a common reference sign M. The stitching margins of two adjacent cover pieces may extend along a length of the corresponding recess and may be stitched together along an inside stitch line ST (e.g., a seam) at the base thereof. For the purpose of this application, the stitched portions are categorized into two different types of stitched portions. For instance, they may be categorized based on the relation with a corresponding recess 10 to 14 and/or the additional components attached or abutting these stitched portions. For example, a plurality of first stitched portions 30 to 34 and a plurality of second stitched portions 35 to 37 may be present. These stitched portions may be symmetrical in the left-to-right direction.

Here will be described an embodiment of the first stitched portions 30 to 34, as an example of the first stitched portions of the present disclosure. First stitched portions 30 to 34 illustrated in FIG. 5 are stitched portions to each of which a cover-side engaging member 40 is attached. Thereby, these first stitched portions 30 to 34 are configured to each be maintained in the intended position within the corresponding recess 10, 12, 14. Specifically, the first stitched portions 30 to 34 may each be maintained in the intended position by a fixing force that comes from an engagement of the cover-side engaging member 40 with the pad-side engaging member 20. That is, the first stitched portions 30 to 34 each receive the aforementioned fixing force. For example, a lateral first stitched portion 30, a plurality of right-side first stitched portions 31, 32, and a plurality of left-side first stitched portions 33, 34 are disposed on the back face of the back cover 6S. The lateral first stitched portion 30 is a stitched portion of the upper-side main cover piece S1 and the lower-side main cover piece S2. Within the lateral first stitched portion 30, respective stitching margins of both main cover pieces S1, S2 overlap in the up-to-down direction. The lateral first stitched portion 30 extends in the left-to-right direction while curving in an upward convex manner. The lateral first stitched portion 30 may be configured to be accommodated within the lateral recess 14, illustrated in FIG. 2. A plurality of right-side first stitched portions 31, 32 and a plurality of left-side first stitched portion 33, 34, all of which are illustrated in FIG. 5, are arranged in a symmetrical manner. The lateral first stitched portion 30 may be positioned therebetween. Since the pair of the first stitched portions 31, 32 and the pair of the first stitched portions 33, 34 may have substantially an identical basic configuration, a detailed description will be provided only for the right-side pair of the first stitched portions 31, 32, for the sake of brevity.

In FIG. 5, the right-upper-side first stitched portion 31 and the right-lower-side first stitched portion 32 are stitched portions disposed on a right portion of the back cover 6S. The upper-right-side first stitched portion 31 is a stitched portion of the upper-side main cover piece S1 and the right-side cover piece S5. At this upper-right-side first stitched portion 31, a stitching margins MC of upper-side main cover pieces S1 and a stitching margins M of the right-side cover piece S5 are arranged in an overlapping manner in a left-to-right direction. Each stitching margin MC, M extends substantially linearly in the up-to-down direction. Similarly, the lower-right-side first stitched portion 32 is a stitched portion of the right-side main cover piece S3 and the right-side cover piece S5. At this lowerright-side first stitched portion 32, stitching margins M of the right-side main cover piece S3 and the right-side cover piece S5 are arranged in an overlapping manner in a left-to-right direction. Each stitching margin M extends substantially linearly in the up-to-down direction. As illustrated in FIGS. 2 and 5, the upper-right-side first stitched portion 31 can be accommodated in an upper portion of the first right-side vertical recess 10. Similarly the lower-right-side first stitched portion 32 can be accommodated in a lower portion of the first right-side vertical recess 10. In FIG. 5 the upper-left-side first stitched portion 33 and the lower-left-side first stitched portion 34 is a stitched portion disposed on a left portion of the back cover 6S. The upper-left-side first stitched portion 33 is a stitched portion of the upper-side main cover piece S1 and the left-side cover piece S6. Similarly, the lower-left-side first stitched portion 34 is a stitched portion of the left-side main cover piece S4 and the left-side cover piece S6. As illustrated in FIGS. 2 and 5, the upper-left-side first stitched portion 33 can be accommodated in an upper portion of the first left-side vertical recess 12. Similarly, the lower-left-side first stitched portion 34 can be accommodated in a lower portion of the first left-side vertical recess 12.

Figure 8:
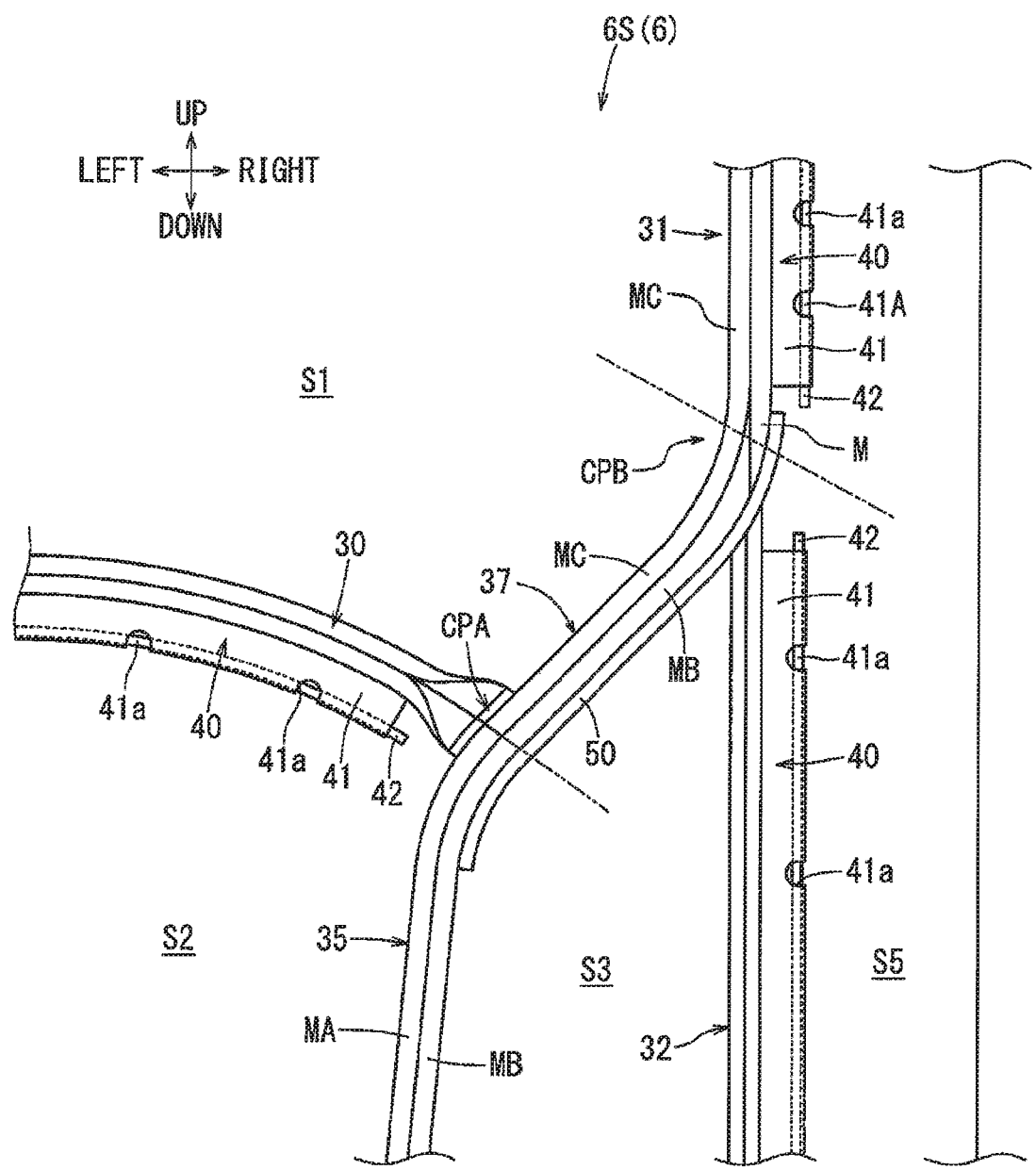
FIG. 8 is an enlarged rear view of the back cover illustrated in FIGS. 4 to 7.

Here will be described an embodiment of the cover-side engaging members 40, as an example of the cover-side engaging member of the present disclosure. As illustrated in FIG. 5, respective cover-side engaging members 40 are attached to the stitched portions 30 to 34. Each cover-side engaging member 40 is disposed at the position where the cover-side engaging member 40 can engage the corresponding pad-side engaging member 20 of the back pad 6P, illustrated in FIG. 2. For the sake of simplicity, each cover-side engaging member is labeled with the reference numeral 40. In this embodiment, each cover-side engaging member 40 has substantially an identical basic configuration. As illustrated in FIG. 8, each cover-side engaging member 40 includes a retaining member 41, which may have a band shape, and a wire 42 retained inside the retaining member 41. The wires are omitted in FIG. 5 for the sake of simplicity. The retaining members 41 are members into which the wires 42 are inserted and which retain the wires 42 therein. Each retaining member 41 may be sewn to and/or attached to a corresponding first stitched portion. The retaining member 41 may be positioned so as to extend along a corresponding recess. The retaining members 41 may each be formed by folding a cloth piece into a U-shape. The materials discussed above for the back cover 6S may also be used for the cloth pieces for forming the retaining member 41. An edge of the retaining member 41 furthest from the back side of the back cover 6S may be the folded edge of the retaining member 41. The retaining member 41 may generally have a flattened tubular shape. A set of plural window portions 41a may be formed on the edge of each retaining member 41. Each window portion 41a may be positioned so as to face a corresponding pad-side engaging member 20. The wires 42 are each inserted into and retained in the retaining member 41. Portions of each wire 42 are exposed to the exterior via the window portions 41a. In this embodiment, the cover-side engaging member 40 of the upper-right-side first stitched portion 31 and the cover-side engaging member 40 of the lower-right-side first stitched portion 32 are positioned so as to have a gap therebetween. The upper-right reinforcement member 50, which will be described in detail below, may overlap and/or be positioned within this gap. Similarly, the cover-side engaging member 40 of the upper-left-side first stitched portion 33 and the cover-side engaging member 40 of the lower-left-side first stitched portion 34 are arranged so as to have a gap therebetween. The upper-left reinforcement member 51, which will be described in detail below, may be disposed within this gap.

Here will be described an embodiment of the second stitched portions 35 to 37 and intersection points CPA to CPD, as an example of these components of the present disclosure. Each of the second stitched portions, which may include the right-side second stitched portion 35, the left-side second stitched portion 36, and the right-middle-side second stitched portion 37, may be a stitched portion to which a cover-side engaging member 40 is not attached. Such second stitched portions may receive less of a fixing force toward the pad-side engaging members 20, when compared to the first stitched portions. The right-side second stitched portion 35 and the right-middle-side second stitched portion 37 and the left-side second stitched portion 36 each have substantially an identical configuration, except that they are arranged so as to be symmetrical in the left-to-right direction. Therefore, description will be made mainly to the right-side second stitched portion 35 and the corresponding right-middle-side second stitched portion 37, for the sake of brevity.

Figure 7:
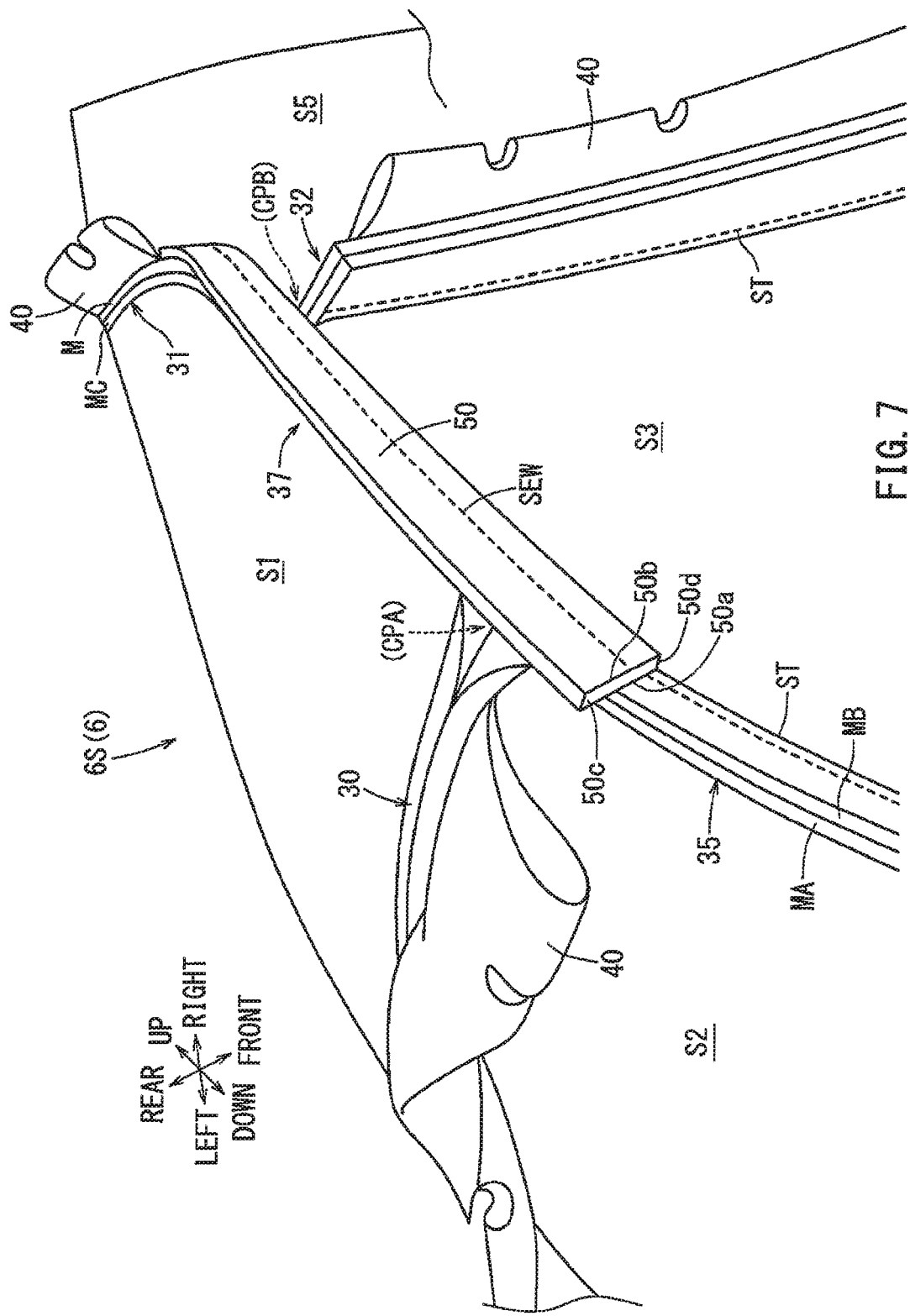
FIG. 7 is an enlarged perspective rear side view of the back cover illustrated in FIGS. 4 to 6.

The right-side second stitched portion 35 illustrated in FIG. 5 is a stitched portion of the right-side main cover piece S3 and the lower-side main cover piece S2. The corresponding right-middle-side second stitched portion 37, as shown in FIG. 5, is a stitched portion of the right-side main cover piece S3 and the upper-side main cover piece S1 (lower-side portion). A lower portion of the right-side second stitched portion 35 extends substantially linearly. The left-side edge of right-middle-side second stitched portion 37 curves rightward gradually while extending toward the uppermost end. At this right-side second stitched portion 35 and the right-middle-side second stitched portion 37, stitching margins MA, MB, MC of adjacent main cover pieces are disposed in an overlapping manner while extending from the left and right sides. For example, as illustrated in FIGS. 7 and 8, at the right-side second stitched portion 35, a right-side stitching margin MB of the right-side main cover piece S3 overlaps the left-side stitching margins MA of the main cover piece S1 in a face-to-face manner. Similarly, at the right-middle-side second stitched portion 37, the right-side stitching margin MB of the right-side main cover piece S3 overlaps the left-side stitching margin MC of the main cover piece S1 in a face-to-face manner. The left-side stitching margin MA and the left-side middle stitching margin MC intersect at the right end of the lateral first stitched portion 30, which extends in the left-to-right direction. For example, they may intersect so as to form a T-shape. The intersection point may constitute the first intersection point CPA. Also, the upper end of the right-middle-side second stitched portion 37 may intersect an end portion of the upper-right-side first stitched portion 31 at an inner stitching margin. The right-middle-side second stitched portion 37 may also intersect an end portion of the lower-right-side first stitched portion 32. These components may intersect so as to form a T-shape. The intersection point may constitute the second intersection point CPB. In the first embodiment, each of the first intersection point CPA and the second intersection point CPB is an example of the intersection point of the first stitched portion and the second stitched portion, of the present disclosure. As is described later, the right-side second stitched portion 35 and the right-middle-side second stitched portion 37 can be accommodated within the second right-side vertical recess 11 illustrated in FIG. 2. The left-side second stitched portion 36 illustrated in FIG. 5 is a stitched portion of the left-side main cover piece S4, the upper-side main cover piece S1 (lower-side portion), and the lower-side main cover piece S2. Also at this left-side second stitched portion 36, respective stitching margins M of adjacent main cover pieces are disposed in an overlapping manner while extending from the left and right sides. Furthermore, a first intersection point CPC and a second intersection point CPD are disposed. These intersection points CPC, CPD are each arranged so as to be symmetrical with respect to the corresponding intersection points CPA, CPB. As is described later, the left-side second stitched portion 36 can be accommodated within the second left-side vertical recess 13 illustrated in FIG. 2.

Here will be described an embodiment of the reinforcement members 50, 51, as an example of the reinforcement members of the present disclosure. To the right-side second stitched portion 35 and the left-side second stitched portion 36, the reinforce members 50, 51 are attached, respectively. It is preferable that these reinforcement members 50, 51 are members that bend less easily than the back cover 6S. Although a material of each reinforcement member 50, 51 is not particularly limited, a material that has a greater rigidity, or less easily bends, than the back cover 6S may be used. Alternatively, a material that has a moderate rigidity may be used. Examples of a material that may be used for these reinforcements member 50, 51 include: a plate material in which fibers are tangled three-dimensionally (fulled), such as felt; a plate material made of a foaming resin, such as slab polyurethane or made of a solid resin; a fabric and leather that is thicker than the back cover 6S; and/or a plate material made of an elastic gum or an elastomer. For example, the reinforcement members 50, 51 may be made of felt or made of a foaming resin having a greater rigidity than that of the back cover 6S, an appropriate flexibility, and an appropriate stretching property (softness).

Figure 9:
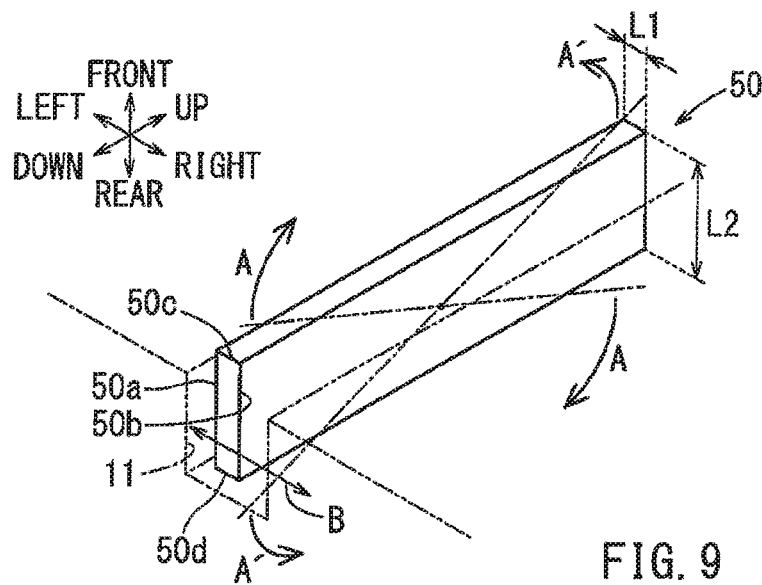
FIG. 9 is a perspective view illustrating the reinforcement member of the back cover illustrated in FIG. 7.

In this embodiment, the upper-right-side reinforcement member 50 and upper-left-side reinforcement member 51 are attached to the right-side second stitched portion 35 (and/or the right-middle-side second stitched portion 37) and the left-side second stitched portion 36, illustrated in FIG. 5, by stitching, respectively. The detailed description will be made only to the upper-right-side reinforcement member 50, by referring to FIGS. 7 to 9, since upper-left-side reinforcement member 51 may have substantially the same basic configuration. The upper-right-side reinforcement member 50 may be a band-shaped plate member elongated along the direction in which the right-side second stitched portion 35 and the right-middle-side second stitched portion 37 extend (e.g., the up-to-down direction indicated in each drawing). Accordingly, the upper-right-side reinforcement member 50 can be attached so as to be along a portion of the right-side second stitched portion 35 and along the entirety of the right-middle-side second stitched portion 37. Detailed attachment procedures will be described later. The upper-right-side reinforcement member 50 may have, when viewed in a cross-sectional view, a substantially rectangular shape and may have a pair of the long sides 50a, 50b and a pair of the short sides 50c, 50d. As illustrated in FIGS. 7 and 9, the upper-right-side reinforcement member 50 can be attached to the right-side second stitched portion 35 and the right-middle-side second stitched portion 37 in an upstanding manner, such that the long sides 50a, 50b are each essentially parallel to the depth direction of the second right-side vertical recess 11 when fitted therein (e.g., in the front-to-rear direction in FIG. 9). The upper-right-side reinforcement member 50, which is in the attached state in the Figures, less easily deforms when the faces of the short sides 50c, 50d bend frontward and/or rearward (e.g., bending along arrows A), than when the faces of the long sides 50a, 50b bend leftward and/or rightward (e.g., bending along an arrow B). The property that the faces of the short sides 50c, 50d of the upper-right-side reinforcement member 50 bend more easily can occur in at least both of the following cases: where the back cover 6S is folded inside-out (e.g., in the front-to-rear direction) as described in detail later; and/or where the upper-right-side reinforcement member 50 is being biased to rise from the second right-side vertical recess 11, illustrated in FIG. 9. With regard to the upper-right-side reinforcement member 50, FIG. 9 depicts that the dimension in the same direction as the width of the second right-side vertical recess 11 is a width L1. For instance, the width L1 may be the same as each length of the short sides 50c, 50d. Similarly, with regard to the upper-right-side reinforcement member 50, FIG. 9 depicts the dimension in the same direction as the depth of the second right-side vertical recess 11 is a vertical dimension L2. For instance, the vertical dimension L2 may be the same as each length of the long sides 50a, 50b. With regard to the upper-right-side reinforcement member 50, the vertical dimension L2 may be greater than the width L1. The difference of length of the width L1 and the vertical dimension L2 can help ensure that the upper-right-side reinforcement member 50 is less easy to deform when the faces of the short sides 50c, 50d bend towards each other, e.g. frontward and rearward.

Here will be described an embodiment of attachment procedures of the reinforcement members 50 and 51. Since each of reinforcement members 50 and 51 is attached to the corresponding second stitched portion 35, 36, 37 illustrated in FIG. 5 in the substantially same way, description will be made only in regards to attachment procedures of the upper-right-side reinforcement member 50, for the sake of brevity. As illustrated in FIGS. 7 and 8, the upper-right-side reinforcement member 50 is arranged to follow an upper portion of the right edge of the right-side second stitched portion 35, and then attached to the right-middle-side second stitched portion 37, and then to the right-upper-side first stitched portion 31 with a stitched line SEW. At this time, the upper-right-side reinforcement member 50 is attached so as to bestride intersection points CPA and CPB, while following the right-side stitching margin MB of the right-side main cover piece S3. The upper-right-side reinforcement member 50 may also follow the entirety of the left-side middle stitching margin MC that overlaps the left-side stitching margin MB and portions of other stitching margins MA, M. In some embodiments, the lower end of the upper-right-side reinforcement member 50 extends below the first intersection point CPA, so as to fully bestride the intersection point CPA. Also, the upper end of the upper-right-side reinforcement member 50 may be arranged to extend above the second intersection point CPB so as to stick out toward the upper-right-side first stitched portion 31 and to be in close proximity of the cover-side engaging member 40. In this positional relation, the upper-right-side reinforcement member 50 is attached to both the right-middle-side second stitched portion 37 and the upper-right-side first stitched portion 31. Therefore, the upper-right-side reinforcement member 50 can bestride the second intersection point CPB from below to above. In the vicinity of the second intersection point CPB, an upper portion of the upper-right-side reinforcement member 50 extends above the upper end of the lower-right-side first stitched portion 32. A farther upper portion of the upper-right-side reinforcement member 50 is attached to the outer face (the right-side face in each drawing) of the upper-right-side first stitched portion 31 in a covering manner. Also, the upper-left-side reinforcement member 51 illustrated in FIG. 5 may be attached to the left-side second stitched portion 36 so as to be symmetrical to the upper-right-side reinforcement member 50 in the left-to-right direction.

Here will be described an embodiment of the covering procedures of the back cover 6S (seat cover). As illustrated in FIGS. 2, 5, and 10, the back pad 6P is covered by the back cover 6S while stitched portions 30 to 37 are each accommodated within the corresponding recess 10 to 14. As illustrated in FIG. 10, when covering the back pad 6P, the bag-shaped back cover 6S is firstly turned up inside out. The inside-out back cover 6S is then gradually turned the right way as it covers back pad 6P. When prior inside-out back covers are turned the right way, a portion of the back cover is folded back onto itself. At this time, aesthetics of the prior back cover may be deteriorated because of excessive bending. For instance, stitched portions without a cover-side engaging member may be inferior in rigidity as compared to other stitched portions because of lack of the cover-side engaging member. Due to the lower rigidity of these stitched portions, there is a concern that the back cover may bend excessively at each of these stitched portions. This may cause wrinkles (gentle bend) at the back cover 6S. Accordingly, the aesthetics of the back cover 6S may become deteriorated. However, the stitched portions illustrated in FIGS. 7 and 8 have a rigidity that is greater at the intersection points CPA, CPB. Thus, it is concerned that the back cover 6S bends significantly at portions of the right-side second stitched portion 35 and the right-middle-side second stitched portion 37, which are in the proximity of the intersection points CPA, CPB.

Therefore, with regard to the back cover 6S of the present embodiment, as illustrated in FIG. 5, the second stitched portions 35 to 37 are arranged so as to be adjacent to some of the first stitched portions 30 to 34. Here, each of the first stitched portions 30 to 34 has the cover-side engaging member 40 attached thereto, and thereby has its position maintained within the corresponding recess. On the other hand, each of the second stitched portions 35 to 37 does not have a cover-side engaging member 40. Additionally, the upper-right-side reinforcement member 50 is attached along the right-side second stitched portion 35 and the right-middle-side second stitched portion 37 so as to bestride the intersection points CPA, CPB. Similarly, the upper-left-side reinforcement member 51 is attached along the left-side second stitched portion 36 so as to bestride the intersection points CPC, CPD.

Thereby, the corresponding second stitched portions illustrated in FIG. 5 are enhanced in rigidity by attachment of the upper-right-side reinforcement member 50 and the upper-left-side reinforcement member 51. Furthermore, the upper-right-side reinforcement member 50 and the upper-left-side reinforcement member 51 are arranged so as to bestride corresponding pairs of intersection points CPA, CPB, and CPC, CPD, respectively. By this arrangement, a starting point that causes an excessive bending—that is a portion where the rigidity changes steeply—rarely occurs in the back cover 6S. As illustrated in FIG. 10, excessive bending of the back cover 6S is suppressed as much as possible by the upper-right-side reinforcement member 50 or the upper-left-side reinforcement member 51. This may especially come into play in cases where the back cover 6S is about to bend excessively at a second stitched portion. Particularly in this embodiment, the upper-right-side reinforcement member 50 and the upper-left-side reinforcement member 51 are each configured such that the vertical dimension L2 is greater than the width L1. This further aids with suppressing excessive bending of the back cover 6S. Thus, when covering the back pad 6P with the inside-out back cover 6S by reversing the back cover 6S to the normal state, the excessive bending of the back cover 6S is suppressed as much as possible. Accordingly, the back cover 6S may be arranged on the back pad 6P in an aesthetic manner.

As illustrated in FIGS. 2 and 5, in covering the back pad 6P with the back cover 6S, each of the first stitched portions 30 to 34 is accommodated within the corresponding recess 10, 12, 14. The cover-side engaging members 40 and the pad-side engaging members 20 are fixed to each other. Then, the position of each of first stitched portions 30 to 34 within the corresponding recess 10, 12, 14 is retained in a relatively stable manner due to the fixing forces of the cover-side engaging members 40 and the respective pad-side engaging members 20. Each of the right-side second stitched portion 35, the right-middle-side second stitched portion 37, and the left-side second stitched portion 36 is accommodated within the corresponding recess 11, 13. Each of these second stitched portions 35 to 37 receives less fixing force, and thereby tends to be less stable within the corresponding recess 11, 13. In this embodiment, the upper-right-side reinforcement member 50 is arranged so as to bestride the intersection points CPA, CPB, respectively. By such an arrangement of the upper-right-side reinforcement member 50, the right-side second stitched portion 35 and the right-middle-side second stitched portion 37 are maintained in an appropriate position in relation to the stitched portions 30 to 32, each of which is adjacent to or in the proximity of the right-side second stitched portion 35 and the right-middle-side second stitched portion 37. Thus, the aesthetics of the stitched parts, which includes the first stitched portions 30 to 32, the right-side second stitched portion 35, and the right-middle-side second stitched portion 37, can be improved. Similarly, the upper-left-side reinforcement member 51 is arranged so as to bestride intersection points CPC, CPD. By such an arrangement, the aesthetics of stitched parts, which includes the first stitched portions 30, 33, 34 and the left-side second stitched portion 36, can be improved.

Furthermore, the right-side second stitched portion 35 and the right-middle-side second stitched portion 37, and the left-side second stitched portion 36 receive less fixing force, which opens the possibility that the aesthetics of the back cover 6S may be adversely affected. For example, a lack of a fixing force may allow the corresponding stitching margins MA, MB, MC to fall over. For example, if the right-side second stitched portion 35 illustrated in FIGS. 7 and 8 where to lack the upper-right-side reinforcement member 50, the left-side stitching margin MA of the right-side second stitched portion 35 would intersect with the lateral first stitched portion 30 at the first intersection point CPA. This would cause the left-side stitching margin MA to be thicker. In this unreinforced state, the right-side stitching margin MB may be pushed by this thickened left-side stitching margin MA, and may then fall over. Due to this falling over, the inside stitch line ST may be tortuous, thereby deteriorating the aesthetics. However, in the present embodiment, the upper-right-side reinforcement member 50 is attached to the thinner right-side stitching margin MB so as to bestride the first intersection point CPA. As described above, the right-side stitching margin MB is reinforced with the upper-right-side reinforcement member 50 to suppress falling over of the right-side stitching margin MB. By this reinforcement, deterioration in the aesthetics of the seat, which may be caused by a tortuous inside stitch line, may be avoided.

As described above, in the present embodiment of the back cover 6S, the reinforcement members 50, 51 are attached to the second stitched portions 35, 36, 37, respectively, each of which receives less fixing force toward the pad-side engaging members 20 as compared to other stitched portions. By these reinforcement members 50, 51, excessive reduction of the rigidity of the second stitched portions may be suppressed. Additionally, each reinforcement member 50, 51 is arranged to bestride the corresponding pair of intersection points CPA and CPB, CPC and CPD. By such an arrangement, the aesthetics of the stitched part, which includes the first stitched portions 30 to 32, the right-side second stitched portion 35, and the right-middle-side second stitched portion 37, can be improved. Similarly, the aesthetics of the stitched part, which includes the first stitched portions 30, 33 and 34, and the right-side second stitched portion 36, can be improved. Accordingly, the back cover 6S can be arranged on the back cover 6P in an aesthetic manner in the case where the back cover 6S includes second stitched portions, to which a cover-side engaging member 40 is not attached.

Figure 11:
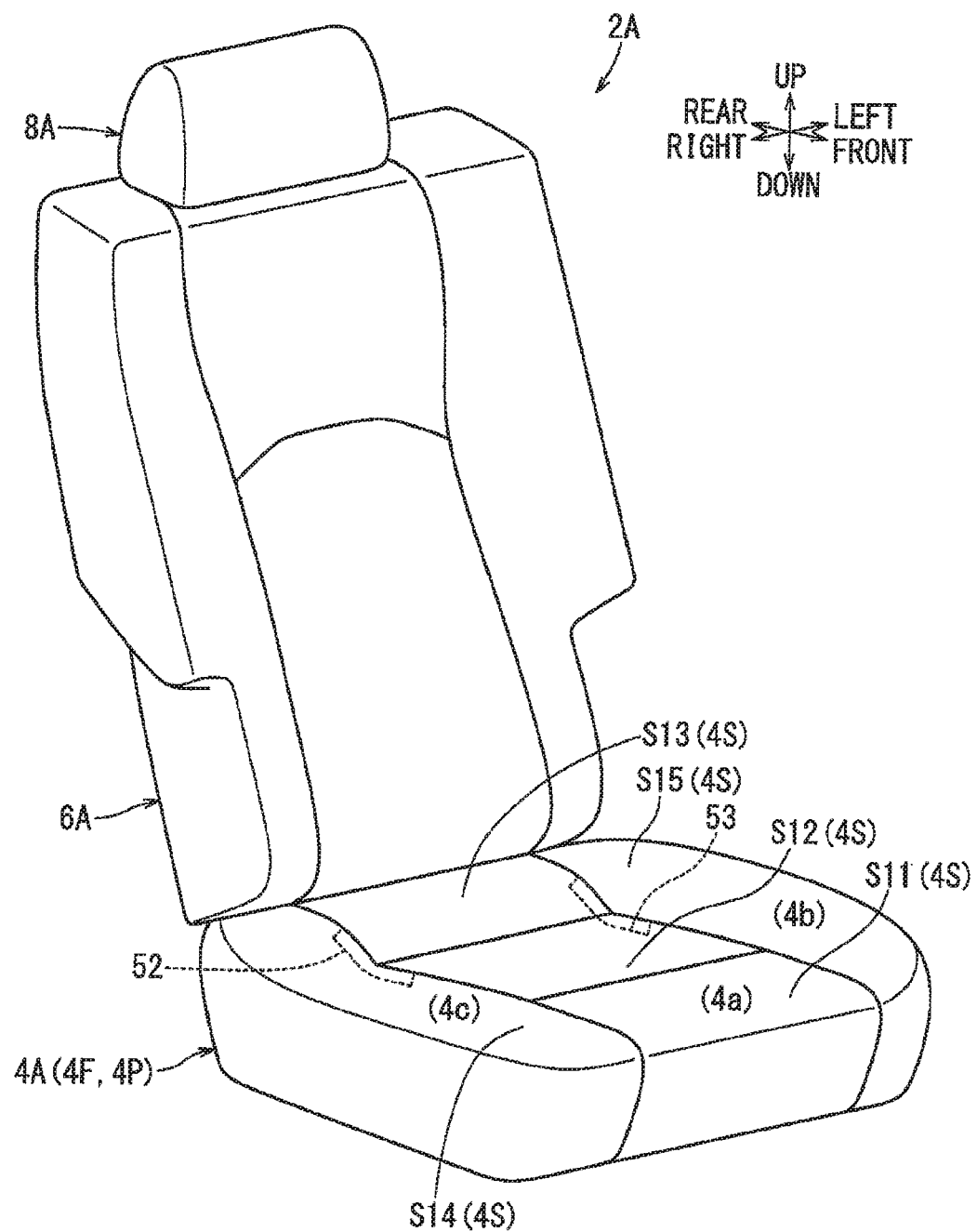
FIG. 11 is a perspective view of a second embodiment of a conveyance seat.

A second embodiment will now be described by exemplifying an embodiment of a seat cushion 4A. With regard to the conveyance seat 2A of the second embodiment, detailed descriptions are omitted with respect to components that have configurations similar to the conveyance seat 2 of the first embodiment, with the understanding that like components are provided with like reference numerals. As illustrated in FIG. 11, the conveyance seat 2A of the second embodiment includes a cushion seat 4A, a seat back 6A, and a head rest 8A. The present disclosure is related to the cushion seat 4A, although it may also apply to other components. This cushion seat 4A is a member that serves as a seat and may have a substantially rectangular shape in a front view. The cushion seat 4A includes the basic components of a cushion frame 4F (not shown) that forms a framework, a cushion pad 4P, and cushion cover 4S. The cushion pad 4P is an example of a seat pad of the present disclosure. The cushion cover 4S is an example of a seat cover of the present disclosure.

As illustrated in FIGS. 12 to 15, the cushion seat 4A includes a plurality of recesses 15 to 18, a plurality of pad-side engaging members 20A, a plurality of stitched portions 31A to 37A, a plurality of cover-side engaging members 40A, and a pair of reinforcement members 52, 53. Similar to the first embodiment, the cushion pad 4P is configured to be covered with a cushion cover 4S. Each of the stitched portions 31A to 37A of the cushion cover 4S is configured to be accommodated within a corresponding recess 15 to 18 of the cushion pad 4P. The cover-side engaging members 40A disposed on some of the stitched portions 31A to 34A and 37A are configured to be fixed to pad-side engaging members 20A disposed in the corresponding recesses. Similar to the first embodiment, the cushion pad 4P of the present embodiment may include recesses that have no pad-side engaging member 20A therein, for example rear portions of recesses 17, 18. In some embodiments, the lack of the pad-side engaging member 20A may result from a lack of thickness, for example. Accordingly, the cushion cover 4S may also be provided with stitched portions having no cover-side engaging member 40A (e.g., at stitched portions 35A and 36A). However, as previously discussed, the lack of the cover-side engaging member 40A may cause deterioration in the aesthetics of the cushion cover 4S. However, in this embodiment, the cushion cover 4S is configured to cover the cushion pad 4P in an aesthetic manner by introducing reinforcement members 52, 53. This may be especially beneficial in cases where stitched portions having no cover-side engaging member 40A, for example stitched portions 35A, 36A. Here will be described detailed configurations of embodiments of each component.

Figure 12:
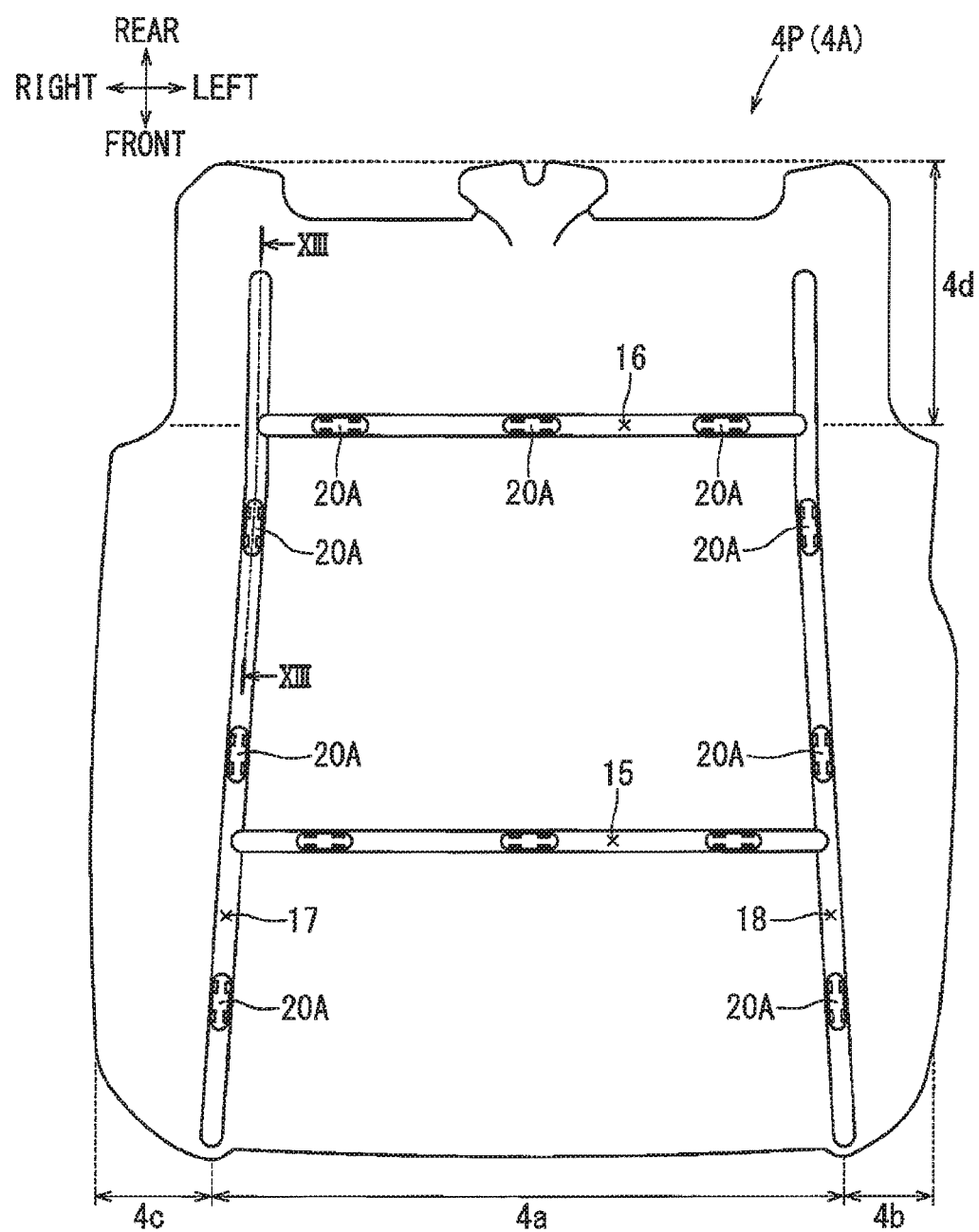
FIG. 12 illustrates a cushion pad of the conveyance seat illustrated in FIG. 11.
Figure 13:
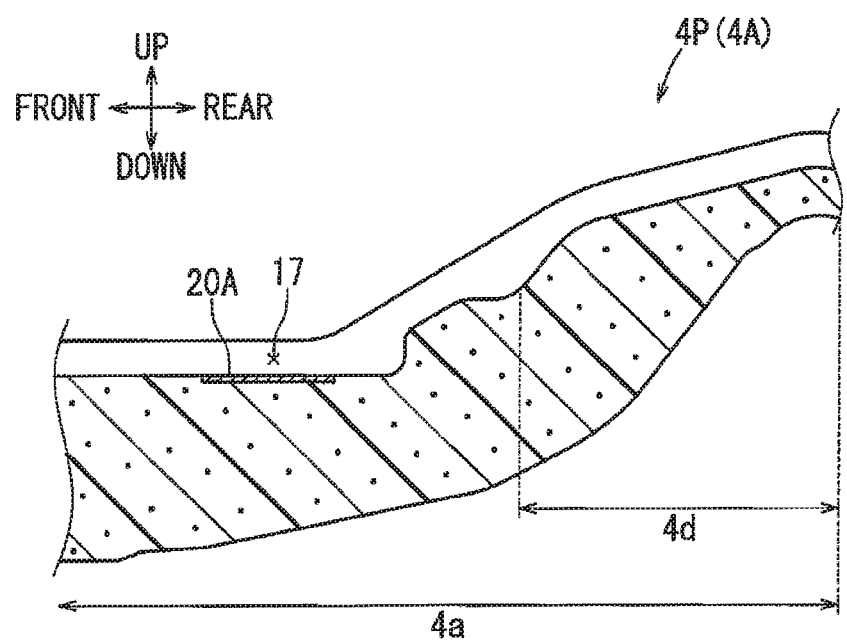
FIG. 13 is a cross-sectional view of the cushion pad taken along line XIII-XIII of FIG. 12.

Here will be described an embodiment the cushion pad 4P, as an example of the seat pad of the present disclosure. As illustrated in FIG. 11, the seat cushion 4A has a configuration in which the cushion pad 4P is disposed on a cushion frame (not shown). Basic configurations of each of the cushion frame 4F and the cushion pad 4P may be substantially similar to those of the corresponding component of the seat back 6 of the first embodiment. The cushion pad 4P illustrated in FIG. 12 is a member that basically determines an external shape of the seat cushion 4 (external shape of the seat). A top face, which corresponds to a seat face, of the cushion pad 4P may be divided into a seat cushion main part 4a, left-side cushion side parts 4b, right-side seat cushion side parts 4c, and a bank part 4d. Recesses 15 to 18 are formed on the top face. The seat cushion main part 4a may be positioned at a center of the seat cushion 4A in a seat-width direction, extending in a seat-depth direction (e.g., the front-to-rear direction) with an appropriate dimension. A right-side seat cushion side part 4c and a left-side seat cushion side part 4b may each be disposed on the sides (e.g., left or right side) of the seat cushion main part 4a, each bulging upward farther than the seat cushion main part 4a. As illustrated in FIGS. 12 and 13, in this embodiment, the bank part 4d is disposed rearward of the seat cushion main part 4a, bulging relatively upward. The cushion pad 4P may gradually bulge rearward at this bank part 4d. In the proximity of rearmost portion of the bank part 4d, the cushion pad 4P may quickly become thinner, for example thinner in the up-down direction as moving towards the proximal end of the bank part 4d in the rearward direction (e.g., see FIG. 13).

Here will be described an embodiment of the recesses 15 to 18, as an example of an embodiment of the recesses of the present disclosure. As illustrated in FIG. 12, a plurality of recesses each having a predetermined width, for example front-side lateral recess 15, rear-side lateral recess 16, right-side vertical recess 17, and left-side vertical recess 18, may be formed. The pad-side engaging members 20A may be disposed within the recesses at desirable locations. In FIG. 12, the recesses 15 and 16 each have a width in the front-to-rear direction. On the other hand, in FIG. 12, recesses 17 and 18 each have a width in the left-to-right direction. The front-side lateral recess 15 may be a recess that laterally crosses a front portion of the seat cushion main part 4a. Also, the rear-side lateral recess 16 may be a recess that laterally crosses a seat cushion main part 4a at a portion in front of the bank part 4d (e.g., at a portion of where the bank part 4d and the seat cushion main part 4a intersect. The right-side vertical recess 17 may be a recess that is formed between the seat cushion main part 4a and the right-side seat cushion side part 4c and that extends along the front-to-rear direction. The right-side vertical recess 17 may also extend into a portion of the bank part 4d at a corner portion where the bank part 4d and the right-side seat cushion side part 4c intersect. The right-side vertical recess 17 may cross the front-side lateral recess 15 and the rear-side lateral recess 16 at certain positions. Similarly, the left-side vertical recess 18 may be a recess that is formed between the seat cushion main part 4a and the left-side seat cushion side part 4b and that extends along the front-to-rear direction. The left-side vertical recess 18 may also extend into a portion of the bank part 4d at a corner portion where the bank part 4d and the left-side seat cushion side part 4b intersect. The left-side vertical recess 18 may cross the front-side lateral recess 15 and the rear-side lateral recess 16 at certain positions. The right-side vertical recess 17 and the left-side vertical recess 18 may each extend linearly along the seat cushion main part 4a in the front-to-rear direction. Each of rear portions of the recesses 17 and 18 may be formed in the bank part 4d, which is relatively thin at least at certain portions thereof.

Here will be described an embodiment of the pad-side engaging members 20A, as an example of the pad-side engaging member of the present disclosure. Similar to the first embodiment, pad-side engaging members 20A are disposed within recesses 15 to 18 at desirable locations. The pad-side engaging members 20A may each have a similar basic configuration as the corresponding members of the first embodiment. Also in this embodiment, no pad-side engaging member 20A may be disposed at respective rear portions of the right-side vertical recess 17 and the left-side vertical recess 18 because such portions are too thin to secure the pad-side engaging member 20A. The other portions of the recesses 15 to 18 may have an appropriate thickness to allow the pad-side engaging members 20A to be disposed. For example, in FIG. 12, three pad-side engaging members 20A are disposed within the front-side lateral recess 15 with a constant gap therebetween. Similarly within the rear-side lateral recess 16 another three pad-side engaging members 20A may be disposed with a constant gap therebetween. Three pad-side engaging members 20A may be disposed within the right-side vertical recess 17 at a front and/or middle portion, the portions being spaced apart from the bank part 4d (e.g., not located within the portion of the right-side vertical recess 17 that is within the bank part 4d). Similarly, another three pad-side engaging members 20A may be disposed within a front and/or middle portion of the left-side vertical recess 18, the portion being spaced apart from the bank part 4d (e.g., not located within the portion of the left-side vertical recess 18 that is within the bank part 4d). These three pad-side engaging members 20A may have an equal gap spacing within the left-side vertical recess 18.

Here will be described an embodiment of a cushion cover 4S, as an example of the seat cover of the present disclosure. The cushion cover 4S illustrated in FIG. 14 includes a cloth constituting an aesthetic face of the seat cushion 4A, although other materials may also be used. The cushion cover 4S includes a plurality of stitched portions 31A to 37A, a plurality of cover-side engaging members 40A, and a pair of reinforcement members 52 and 53. A seat face of the cushion cover 4S may include a front-side main cover piece S11, a middle main cover piece S12, a rear-side main cover piece S13, a right-side cover piece S14, and a left-side cover piece S15. The right-side cover piece S14 is a cover piece covering the right-side seat cushion side part 4c. Similarly, the left-side cover piece S15 is a cover piece covering the left-side seat cushion side part 4b. The right-side cover piece S14 and the left-side cover piece S15 may have substantially symmetrical shapes in the left-to-right direction and may each have a rectangular shape elongated along the front-to-rear direction from a top view.

Figure 14:
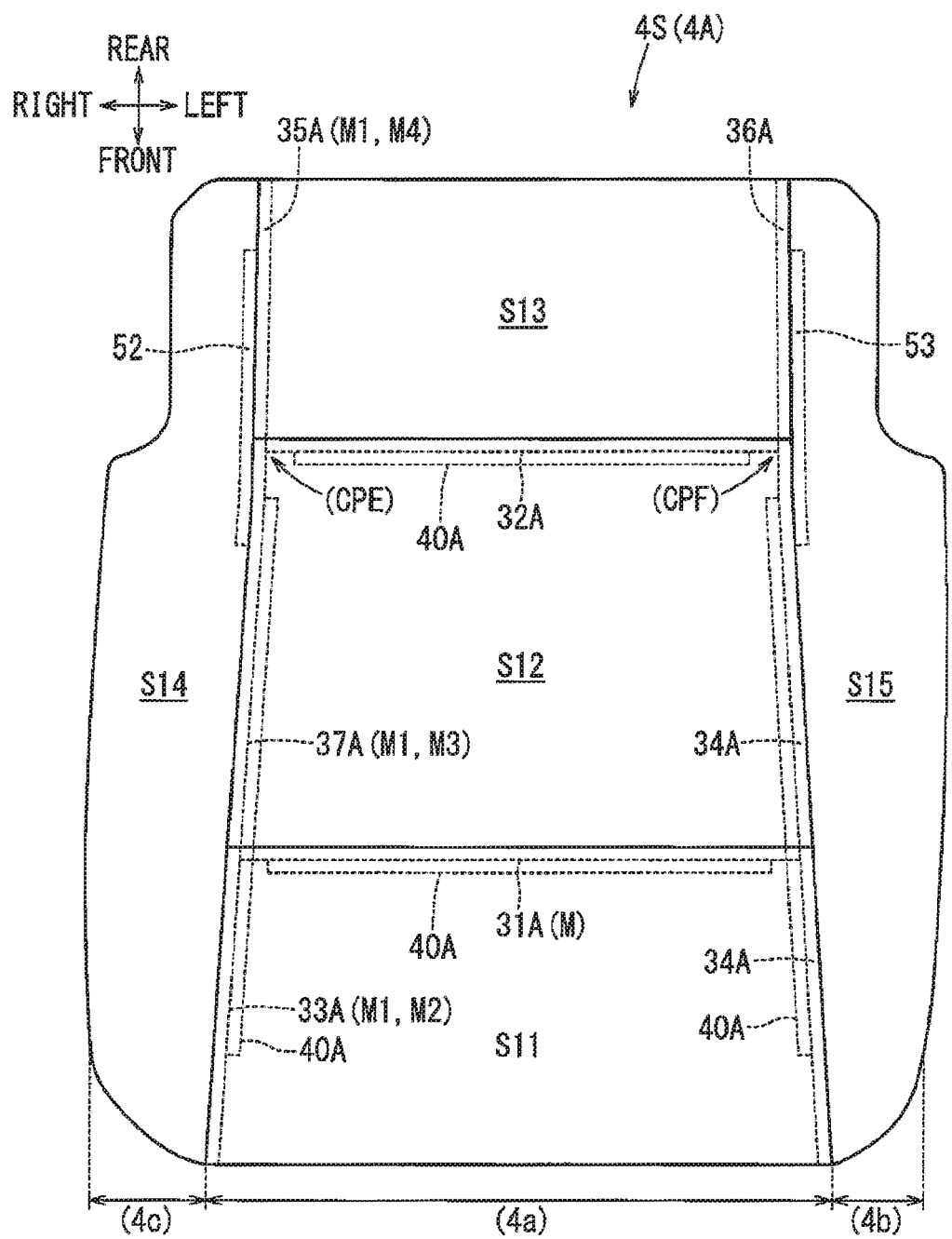
FIG. 14 is an upper view of a cushion cover of the cushion pad illustrated in FIG. 12.

As illustrated in FIG. 14, the front-side main cover piece S11, middle cover piece S12, and rear-side main cover piece S13 may cover the seat cushion main part 4a and may be arranged from front to rear in this order. These main cover pieces S11 to S13 are cover pieces each of which may have a rectangular shape from a top view. The rear-side main cover piece S13 may have the smallest dimension, in the front-to-rear direction. The rear-side main cover piece S13 may cover the bank part 4d of the seat cushion main part 4a. The front-side main cover piece S11 and middle main cover piece S12 may cover a front and/or middle portion of the seat cushion main part 4a, which is spaced apart from the bank part 4d.

Figure 17:
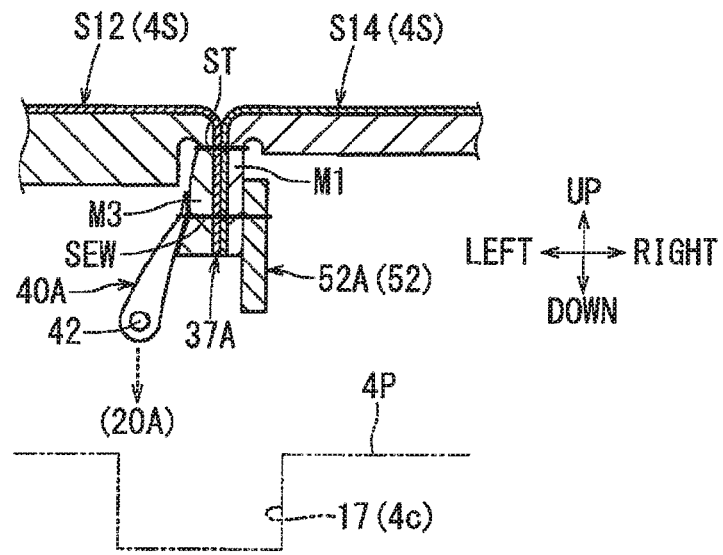
FIG. 17 is a cross-sectional view of the cushion cover taken along line XVII-XVII of FIG. 16.

Here descriptions will be made regarding embodiments of thicknesses of the skin pieces S11 to S15. Here, the thickness of each of the cover pieces S11 to S15 is not limited, but, for sake of sitting comfort, it may be desirable that cover pieces covering the seat cushion main part 4a each have a different thicknesses. For example, in this embodiment the thickness of each of the main cover pieces S11 to S13 is greater than the thickness of each of the right-side cover piece S14 and left-side cover piece S15. These differences in thickness may facilitate sitting comfort. The method to adjust the thickness of each cover piece S11 to S15 is not limited. In this embodiment, the thickness of each cover piece S11 to S15 is adjusted by varying the thickness of a pad material, as illustrated in FIG. 17. Other example of a method for adjusting the thickness include, using a set of fabrics or leather pieces having different thicknesses, and removing at least a portion of a pad material or a backing.

Figure 15:
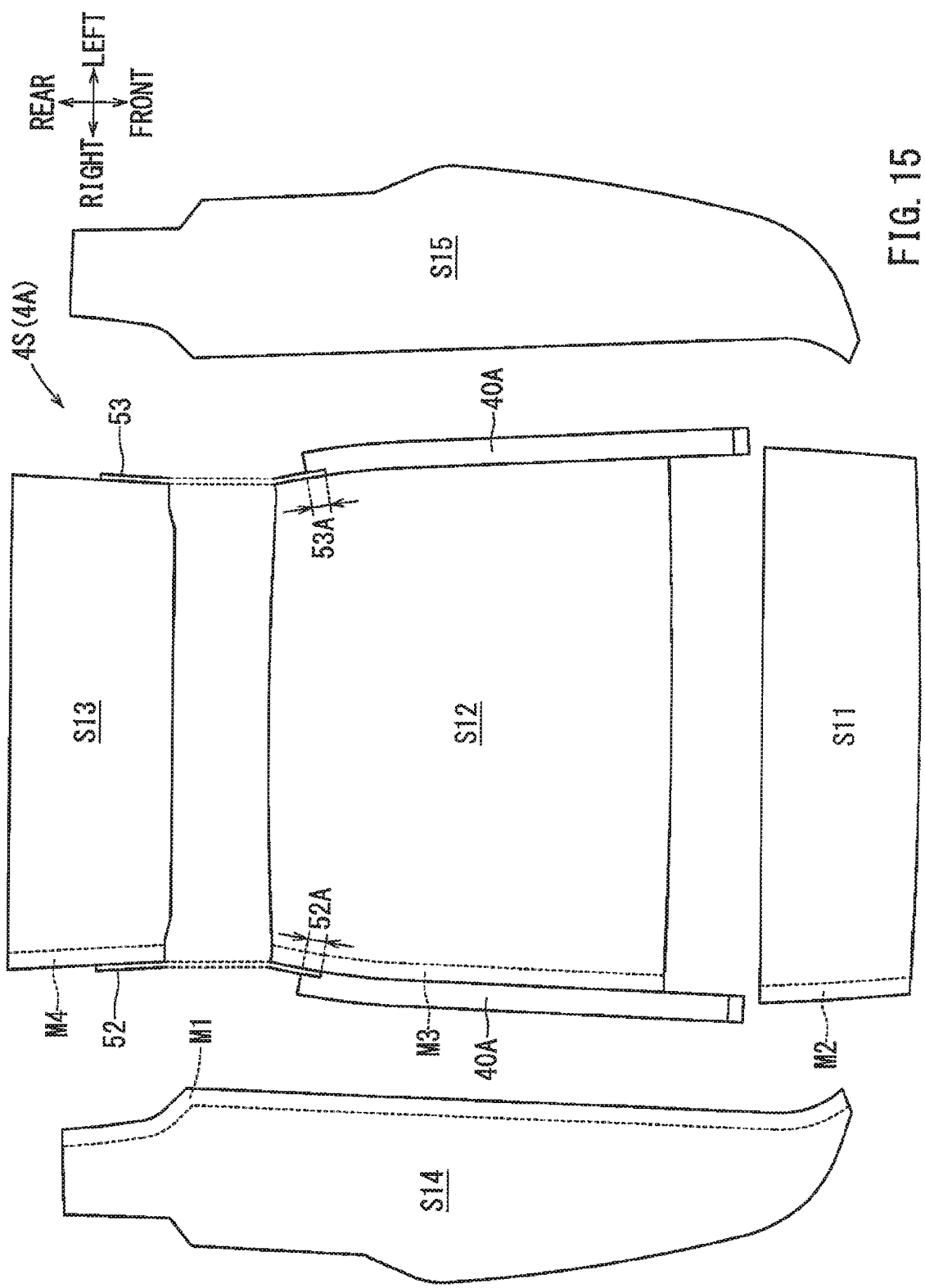
FIG. 15 is a developed view illustrating the cover pieces constituting the cushion cover illustrated in FIG. 14.
Figure 16:
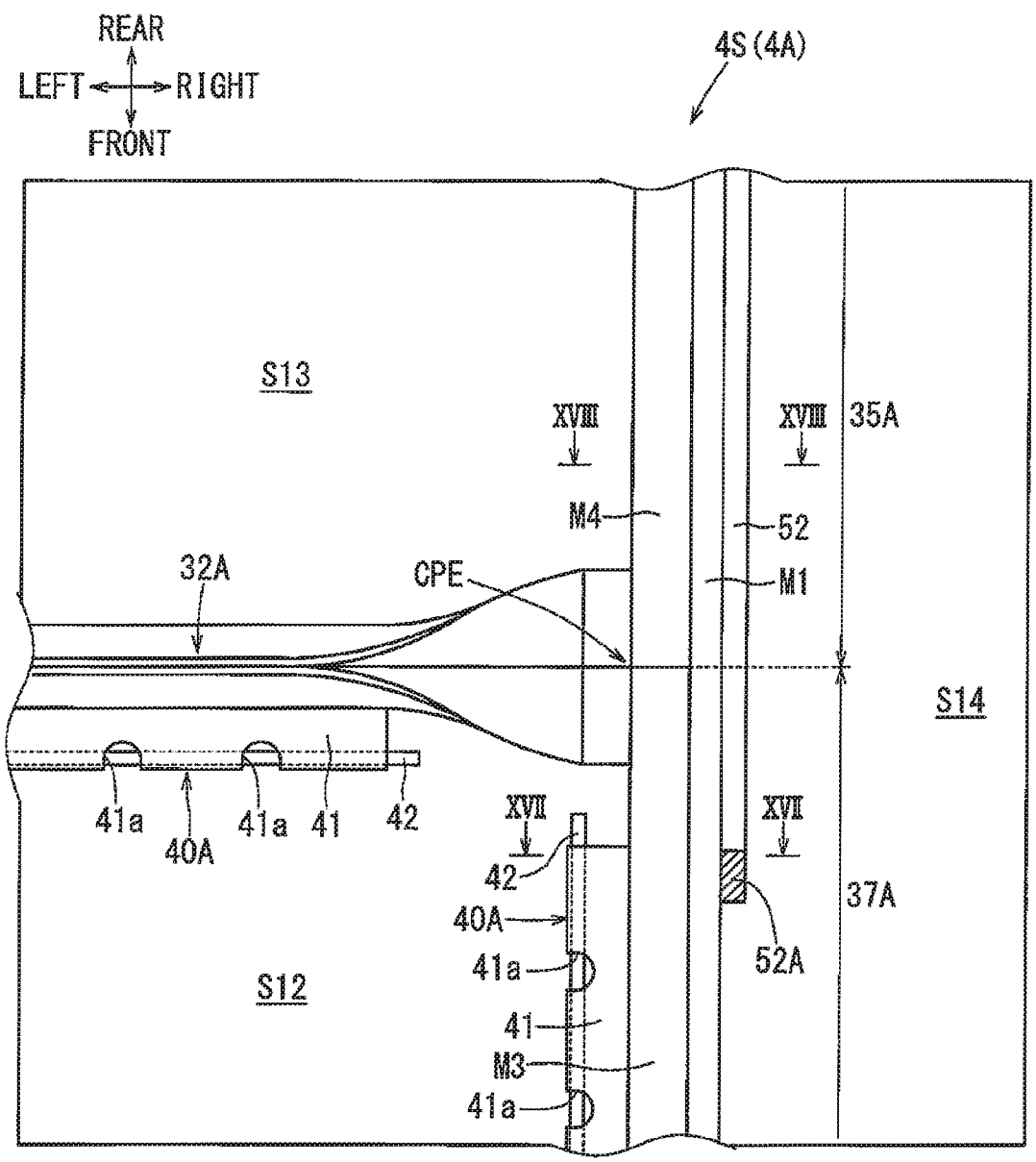
FIG. 16 is an enlarged rear view of the cushion cover illustrated in FIGS. 14 and 15.

Here will be described an embodiment of first stitched portions 31A to 34A and 37A and second stitched portions 35A, 36A, as an example of the first and second stitched portions of the present disclosure. Similarly to the first embodiment, as illustrated in FIGS. 14 to 16, the cushion cover 4S may include a plurality of first stitched portions 31A to 34A and 37A, and a pair of second stitched portions comprising a right-side second stitched portions 35A and a left-side stitched portion 36A. For example, a front-side first stitched portion 31A, a right-middle-side first stitched portion 37A, a rear-side first stitched portion 32A, a right-side first stitched portion 33A, and a left-side first stitched portion 34A are disposed on the cushion face of the cushion cover 4S. The front-side first stitched portion 31A may comprise a stitched portion of the front-side main cover piece S11 and the middle main cover piece S12, where respective stitching margins M (e.g., seam allowances) of both main cover pieces are maintained in an overlapping manner. Similarly, the rear-side first stitched portion 32A may comprise a stitched portion of the middle main cover piece S12 and the rear-side main cover piece S13, where respective stitching margins M of both main cover pieces are maintained in an overlapping manner. The front-side first stitched portion 31A may extend in the left-to-right direction and may be accommodated within the front-side lateral recess 15 illustrated in FIG. 12. Similarly, the rear-side first stitched portion 32A may extend in the left-to-right direction and may be accommodated within the rear-side lateral recess 16.

Here will be described an embodiment of the first stitching margin, second stitching margin, third stitching margin, and fourth stitching margin, as an example of the stitching margins of the present disclosure. The right-side first stitched portion 33A illustrated in FIG. 14 is a stitched portion of the right-side cover piece S14 and the front-side main cover piece S11, where respective stitching margins M1, M2 are maintained in an overlapping manner in the left-to-right direction. The right-middle-side first stitched portion 37A illustrated in FIG. 14 is a stitched portion of the right-side cover piece S14 and the middle main cover piece S12, where respective stitching margins M1, M3 are maintained in an overlapping manner in the left-to-right direction. The stitching margins M2, M3 of the front-side main cover piece S11 and the middle main cover piece S12 may both be thicker than the first stitching margins M1 of the right-side cover piece S14. The right-side first stitched portion 33A and the right-middle-side first stitched portion 37A may extend substantially linearly in the front-to-rear direction and may be accommodated within the right-side vertical recess 17 at the front and/or middle portion, this portion(s) being in front of the bank part 4d. The left-side first stitched portion 34A illustrated in FIG. 14 is a stitched portion of the left-side cover piece S15, the front-side main cover piece S11, and the middle main cover piece S12, where respective stitching margins (reference numerals omitted) are maintained in an overlapping manner in the left-to-right direction. This left-side first stitched portion 34A also may extend substantially linearly in the front-to-rear direction and may be accommodated within the left-side vertical recess 18 at the front and/or middle portion, this portion(s) being in front of the bank part 4d.

Here will be described an embodiment of the cover-side engaging members 40A, as an example of the cover-side engaging member of the present disclosure. The cover-side engaging members 40A are attached to the first stitched portions 31A to 34A and 37A, as illustrated in FIG. 14. These cover-side engaging members 40A are each disposed at a desirable position, where each of the cover-side engaging members 40A can engage a corresponding pad-side engaging member 20A of the cushion pad 4P, as illustrated in FIG. 12. For example, attached to the front-side first stitched portion 31A and the rear-side first stitched portion 32A, are cover-side engaging members 40A extending in the left-to-right direction. Also, attached to the right-side first stitched portion 33A, the right-middle-side first stitched portion 37A, and the left-side first stitched portion 34A, respectively are cover-side engaging members 40A extending in the front-to-rear direction. At the right-side first stitched portion 33A, the right-middle-side first stitched portion 37A, and the left-side first stitched portion 34A, as illustrated in FIGS. 16 and 17, the cover-side engaging members 40A are attached on sides of thicker stitching margins such as the second stitching margin M2 and the third stitching margin M3. The cover-side engaging members 40A each may have a substantially similar basic configurations and each may have a retaining member 41 and a wire 42, as illustrated in FIG. 16.

Here descriptions will be made regarding an embodiment of the second stitched portions 35A and 36A and intersection points CPE, CPF, as an example of these components of the present disclosure. The right-side second stitched portion 35A and the left-side second stitched portion 36A may be arranged so as to be symmetrical in the left-to-right direction, with the rear-side first stitched portion 32A being interposed therebetween. Since these right-side second stitched portion 35A and left-side second stitched portion 36A may have substantially similar basic configurations, only detailed descriptions regarding the right-side second stitched portion 35A will be made as an example. The right-side second stitched portion 35A illustrated in FIG. 16 may comprise a stitched portion of a rear portion of the right-side cover piece S14 and the main cover piece S13. This right-side second stitched portion 35A may extend in the front-to-rear direction substantially linearly so as to substantially continue to the right-middle-side first stitched portion 37A. At the right-side second stitched portion 35A, the first stitching margin M1 of the right-side cover piece S14 and the fourth stitching margin M4 of the rear-side main cover piece S13 overlap in the left-to-right direction and in a face-to-face manner. As depicted in FIG. 14, the rightmost portion of the rear-side first stitched portion 32A crosses a rear portion of the fourth stitching margin M4 in a generally orthogonal manner, thereby forming the intersection point CPE. The intersection point CPE may be a point where three or more panels of a cover come together. The intersection point CPE is an example of an intersection point of a first stitched portion and a second stitched portion of the present disclosure. The right-side second stitched portion 35A may be accommodated within the right-side vertical recess 17 at a rear portion thereof, corresponding to a portion of the right-side vertical recess 17 within the bank part 4d. The left-side second stitched portion 36A illustrated in FIG. 14 may be a stitched portion of a rear portion of the left-side cover piece S15 and the rear-side main cover piece S13. Similarly, another intersection point CPF illustrated in FIG. 14 may be formed at the left-side second stitched portion 36A. This intersection point CPF may be arranged so as to be symmetrical with the intersection point CPE of the right-side second stitched portion 35A, in the left-to-right direction. The left-side second stitched portion 36A may be accommodated within the left-side vertical recess 18, as illustrated in FIG. 12, at a rear portion of the left-side vertical recess 18 corresponding to the bank part 4d.

Here will be described an embodiment of the reinforcement members 52, 53 and the overlapping portions 52A, 53A, as an example of the reinforcement member and the overlapping portion of the present disclosure. As illustrated in FIG. 14, the reinforcement member 52 may be attached to the right-side second stitched portion 35A. In some embodiments, the reinforcement member 52 may be made of felt, however other suitable materials may also be used. Similarly, the reinforcement member 53 may be made of felt and may be attached to the left-side second stitched portion 36A. Since the reinforcement member 52 of the right-side second stitched portion 35A and the reinforcement member 53 of the left-side second stitched portion 36A have substantially similar basic configurations, detailed descriptions will only be made by exemplifying the reinforcement member 52, for the sake of brevity. The reinforcement member 52 illustrated in FIGS. 14 to 16 may have a band-shaped plate elongated in the direction of the right-side second stitched portion 35A, namely the front-to-rear direction in each drawing, and may be attached so as to be along the right-side second stitched portion 35A. The reinforcement member 52 may further extend in the direction of a portion of the right-middle-side second stitched portion 37A, namely the front-to-rear direction in each drawing, and may be attached so as to be along a portion of the right-middle-side second stitched portion 37A. The foremost portion of the reinforcement member 52 of the present embodiment may be an overlapping portion 52A. The overlapping portion 52A may be arranged to generally follow the direction of the right-middle-side first stitched portion 37A being overlapped by the overlapping portion 52A, as illustrated in FIGS. 16 and 17. The overlapping portion 52A may overlap a portion of the cover-side engaging member 40A, for example in a right-to-left direction when positioned within the correspond recess. In FIG. 16, the overlapping portion 52A is emphasized with solid hatching.

Figure 18:
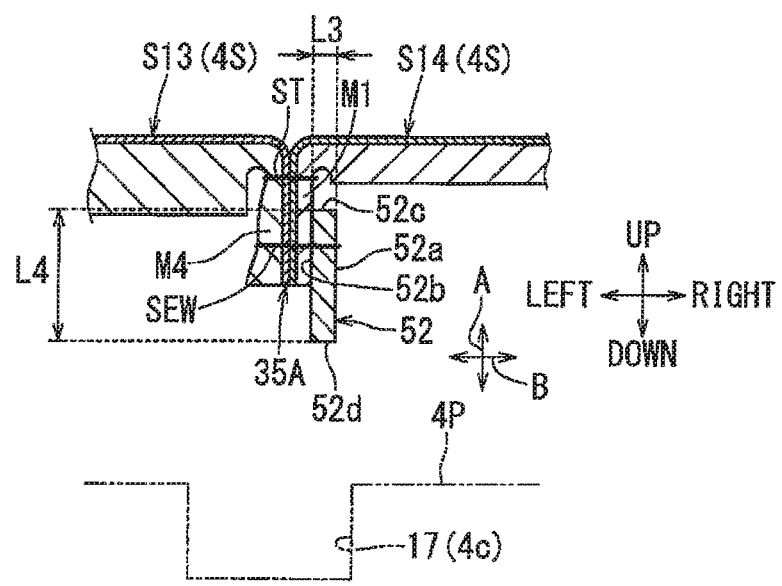
FIG. 18 is a cross-sectional view of the cushion cover taken along line XVIII-XVIII of FIG. 16.

The reinforcement member 52 may have a substantially rectangular shape in a cross-sectional view, as illustrated in FIG. 18. The reinforcement member 52 may have a pair of the long sides 52a, 52b and a pair of the short sides 52c, 52d. The reinforcement member 52 may be attached to the right-side second stitched portion 35A and a portion of the right-middle-side second stitched portion 37A in an upstanding manner, with the long sides 52a, 52b being in the depth direction of the right-side vertical recess 17 (e.g., along the up-to-down direction in FIG. 18). Embodiments of attachment procedures of the reinforcement member 52 will be described in detail later. The reinforcement member 52 is configured to deform less easily when the faces, for example the short sides 52c, 52d, bend in one direction, for example upward and/or downward (e.g., bending toward directions pointed by an arrow A), than when the faces, for example the long sides 51a, 51b, bend in a second direction, for example leftward and/or rightward (e.g., bending toward directions pointed by an arrow B). The deformation force in which the faces, for instance the short sides 52c, 52d, of the reinforcement member 52 (e.g., a deformation force toward the direction pointed by the arrow A) often occurs when the right-side second stitched portion 35A rises from the right-side vertical recess 17 or when the cushion cover 4S is being folded outside-in (e.g., when the cushion cover 4S is being folded from the frontward-to-rearward direction when covering the cushion pad 4P). The deformation force in which the faces, for example the long sides 52a, 52b, of the reinforcement member 52 bend (e.g., a deformation force toward the directions pointed by the arrow B) often occurs when the cushion cover 4S is deformed, e.g., stretched and/or compressed, in the left-to-right direction. For example, when the reinforcement member 52 follows the stretch and compression direction of the cushion cover 4S, the long sides 52a, 52b of the reinforcement member 52 bend and deform in the left-to-right direction. As previously discussed, the left-to-right direction may be the width direction of the right-side vertical recess 17. As illustrated in FIG. 18, a width L3 of the reinforcement member 52 corresponds to a dimension that is in the same direction as the width of the right-side vertical recess 17, where the reinforcement member 52 is accommodated within the right-side vertical recess 17. As illustrated in FIG. 18, the width L3 corresponds to the length of the short sides 52c, 52d. Also, a vertical dimension L4 of the reinforcement member 52 corresponds to a dimension that is in the same direction as the depth of the right-side vertical recess 17, where the reinforcement member 52 is accommodated within the right-side vertical recess 17. This vertical dimension L4 corresponds to the length of the long sides 52a and 52b in FIG. 18. The vertical dimension L4 of the reinforcement member 52 may be greater than the width L3 of the reinforcement member 52. This size relationship makes it possible that, with regard to the bending degree of the reinforcement member 52, the reinforcement member 52 less easily deforms in a direction in which an axis passes through both short sides 52c, 52d.

Here will be described an embodiment of attachment procedures of the reinforcement members 52, 53. Since embodiments of attachment procedures of the reinforcement member 52 corresponding to the right-side second stitched portion 35A and the reinforcement member 53 corresponding to the left-side second stitched portion 36A are substantially the same, descriptions with regard to attachment procedures will only be made with reference to the reinforcement member 52, as an example and for brevity. As illustrated in FIGS. 16 to 18, the reinforcement member 52 is arranged so as to be positioned along the right-side second stitched portion 35A. Then, the reinforcement member 52 is attached to the right-side second stitched portion 35A and the right-middle-side second stitched portion 37 with a stitch line SEW. As previously discussed, the right-side second stitched portion 35A and the right-middle-side second stitched portion 37A may both comprise a portion of the stitching margin M1 of the right-side cover piece S14. As also previously discussed, this stitching margin M1 may be thinner than corresponding stitching margins M3 and/or M4. Accordingly, the reinforcement member 52 may be attached on a side with a thinner stitching margin M1 so as to bestride the intersection point CPE. For instance, the overlapping portion 52A may be arranged in front of the intersection point CPE such that the reinforcement member 52 may be attached to the right-side second stitched portion 35A and the right-middle-side second stitched portion 37A so as to bestride the intersection point CPE, e.g. along the front-to-rear direction. Furthermore, as illustrated in FIGS. 16 and 17, the overlapping portion 52A of the reinforcement member 52 may extend so as to overlap a rearmost portion of the corresponding cover-side engaging member 40A. That is, the overlapping portion 52A may be arranged to overlap the cover-side engaging member 40A in the left-to-right direction. In FIG. 16, the overlapping portion 52A is to the right of the cover-side engaging members 40A. For instance, the overlapping portion 52A may be on a side of the stitched portion 37A opposite to the cover-side engaging member 40A. Similarly, the reinforcement member 53 may be attached so as to be symmetrical, in the left-to-right direction, with the reinforcement member 52. An overlapping portion 53A of the reinforcement member 53 may be arranged to overlap the corresponding cover-side engaging member 40A.

Figure 19:
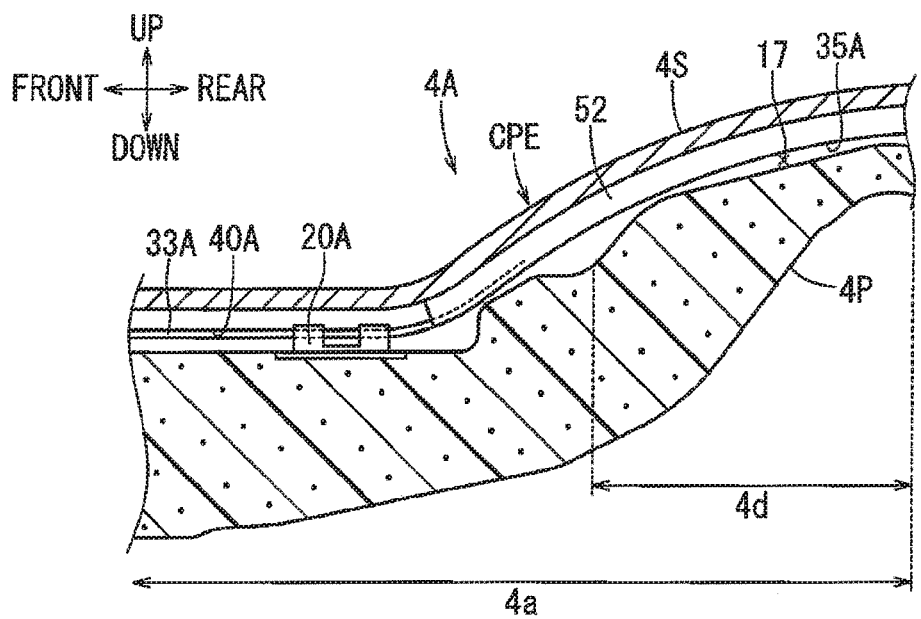
FIG. 19 is a cross-sectional view of a portion of the seat cushion illustrated in FIG. 11.

Here will be described an embodiment of the covering procedures of the cushion cover 4S. As illustrated in FIGS. 12 and 14, each of the stitched portions 31A to 37A may be accommodated within a corresponding recess 15 to 18, when the cushion pad 4P is covered by the cushion cover 4S. At the time, each of the first stitched portions 31A to 34A, 37A is accommodated within the corresponding recess 15 to 18, while each cover-side engaging member 40A and the corresponding pad-side engaging member are fixed to each other. By this fixing arrangement, each of the first stitched portions 31A to 34A, 37A is maintained within the corresponding recess 15 to 18. The position thereof is relatively stable due to the fixing forces of the cover-side engaging members 40A and the pad-side engaging members 20A. Each of the second stitched portions 35A and 36A is also accommodated within the corresponding recess 17, 18. Then, from an aesthetics perspective of the cushion cover 4S, each of the second stitched portions 35A and 36B should be prevented from rising from the corresponding recess 17, 18 in an undesirable manner. However, each of the right-side second stitched portion 35A and left-side second stitched portion 36A receives less of a fixing force, as compared to the first stitched portions 31A to 34A, 37A. Thereby it may be more difficult to maintain the position of the second stitched portions 35A, 36A within the corresponding recess 17, 18. For instance, as illustrated in FIG. 19, the right-side second stitched portion 35A is accommodated within the portion of the right-side vertical recess 17 in the bank part 4d. Thus, without any reinforcement, the right-side second stitched portion 35A would have a tendency to tilt forward, or bend, at the intersection point CPE. This would likely result in the unreinforced second stitched portion rising from the right-side vertical recess 17. When the unreinforced right-side second stitched portion 35A rises from the right-side vertical recess 17, the intersection point CPE, which likely corresponds to the bending starting point, may be pressed. This could cause the cushion cover 4S to become wrinkled.

With regard also to the cushion cover 4S of this embodiment, as illustrated in FIG. 14, the second stitched portions 35A and 36A are arranged so as to be adjacent to one or more of the first stitched portions 30A to 34A, 37A. Here, each of the first stitched portions 30A to 34A, 37A has a cover-side engaging member 40A attached thereto. Thereby, its position within the corresponding recess is substantially maintained. On the other hand, each of the second stitched portions 35A and 36A does not have the cover-side engaging member 40A. However, the reinforcement member 52 and the reinforcement member 53 are attached along the right-side second stitched portion 35A and the left-side second stitched portion 36A, respectively. Each of the reinforcement members 52, 53 is arranged to bestride the corresponding intersection point CPE, CPF.

As illustrated in FIG. 14, since the corresponding reinforcement member 52, 53 is attached to each of the right-side second stitched portion 35A and the left-side second stitched portion 36A, these second stitched portions are less likely to bend, especially in the upward and downward directions. Bending in these directions would also cause each of the reinforcement members 52 and 53 to rise from the corresponding recess. Accordingly, each of the reinforcement members 52, 53 may be arranged so as to bestride the corresponding intersection point CPE, CPF. This arrangement may suppress a generation of the starting point of tilting in the cushion cover 4S. Thus, in cases where each of the right-side second stitched portion 35A and the left-side second stitched portion 36A have forces applied to tilt them forward in a manner that the corresponding intersection point CPE, CPF would be the tilting starting point, the corresponding reinforcement members 52, 53 aid with suppressing the tilting. This tilting suppression is further increased by the vertical dimension L4 being set greater than the width L3. As described above and illustrated in FIG. 16, the overlapping portion 52A of the reinforcement member 52 and the overlapping portion 53A of the reinforcement member 53 may overlap a portion of the corresponding cover-side engaging member 40A. Thus, the position of the right-side second stitched portion 35A within the corresponding recess may be maintained in a position that is similar to the right-middle-side first stitched portion 37A. Similarly, the position of the left-side second stitched portion 36A within the corresponding recess may be maintained in a position that is similar to the left-side first stitched portion 34A. For example, with regard to the relative position with respect to the right-side vertical recess 17, when considered in the depth direction, the right-middle-side first stitched portion 37A and the right-side second stitched portion 35A, embodiments of which are illustrated in FIG. 19, are aligned in substantially the same position. These stitched portions 37A, 35A are accommodated within the right-side vertical recess 17 so as to continue in a smooth and aligned manner.

With regard to some cushion covers, there may be a concern that stitching margins of each stitched portion may fall over, thereby causing the inside stitch line ST to become contorted and/or wavy. This may be especially problematic when the stitched portion has stitching margins that have differing thicknesses. As illustrated in FIGS. 16 to 18, the right-middle-side first stitched portion 37A and the right-side second stitched portion 35A have stitching margins M1, M3, M4 that overlap in a face-to-face manner, with some stitching margins M3, M4 being thicker than the facing stitching margin M1. In this embodiment, the cover-side engaging member 40A is attached on a side adjacent to the third stitching margin M3 of the right-middle-side first stitched portion 37A as well as to the second stitching margin M2 of the right-side first stitched portion 33A. Accordingly, the third stitching margin M3 and the second stitching margin M2 may be kept upstanding (e.g., forced to upstand) along the depth direction of the right-side vertical recess 17 as a result of the fixing force of the cover-side engaging member 40A and the pad-side engaging member 20A. On the other hand, no cover-side engaging member 40A is attached to the first stitching margin M1. Without a reinforcement member, these first stitching margins M1 would be subject to more easily falling over. Thus, in this embodiment, a reinforcement member 52 is attached to a portion of the stitching margin M1 that is not affixed to the cover-side engaging member 40A. Additionally, the overlapping portion 52A of the reinforcement member 52 is arranged so as to overlap a portion of the stitching margin M3 of the right-middle-side first stitched portion 37A. As described above, the right-middle-side first stitched portion 37A and the right-side second stitched portion 35A are both forced to upstand, even in an area where no cover-side engaging member 40A aids with maintaining this positioning. By this reinforcement in the area with no cover-side engaging member 40A, unintended falling over of the stitching margin M1 may be avoided. In this embodiment, the reinforcement member 52 is attached to a different side of the stitched portion than that to which the cover-side engaging members 40A is attached. This further aids with avoiding the inside stitch ST becoming wavy, that may be caused by the falling over of each stitching margin M1, M4.

In the above embodiment, the cushion cover 4S, may be stretched under an appropriate tension across the top face thereof, especially under a tension along the left-to-right direction of the figures (e.g., the width direction of certain recesses). At this time, the tension causes the cushion cover 4S to be elongated, stretched and/or compressed across the top face (e.g., left-to-right direction in FIG. 18). At the time. It may be desirable to maintain the ability of the cushion cover 4S to so move. Accordingly, it may be desirable that the reinforcement members 52, 53 do not interfere with these movements of the cushion cover 4S. In this embodiment, each reinforcement member 52, 53 is structured so as to relatively easily bend in the left-to-right direction. For instance, the reinforcement member 52, 53 may bend relatively easily in the width direction of the corresponding recess 17 or in the directions indicated by the arrow B in FIG. 18. With such a structure and positioning, the reinforcement members 52 and 53 may follow the anticipated stretch and compression of the cushion cover 4S. This contributes to improvement of aesthetics of the cushion cover 4S. In this embodiment, the width L3 of each of the reinforcement members 52, 53 is smaller than the vertical dimension L4. This relation enables the reinforcement members 52, 53 to follow the anticipated stretch and compression of the cushion cover 4S more easily.

As described above, with regard the cushion cover 4S of the present embodiment, the reinforcement members 52, 53 are attached to the right-side second stitched portion 35A and the left-side second stitched portion 36A, respectively. Each of these stitched portions 35A, 36A receives a relatively weak fixing force toward the pad-side engaging members 20A. By utilizing these reinforcement members 52, 53, each of the second stitched portions 35A, 36A may be prevented from excessively rising from the corresponding recess 17, 18, or being bent in such a direction. Each of the reinforcement members 52, 53 is arranged to bestride the corresponding intersection point CPE, CPF. This aids with improving the aesthetics of the stitched part in both the first stitched portions 37A, 34A and the second stitched portions 35A, 36A. In this embodiment, the reinforcement member 52 is formed so as to be less flexible in a release direction. Similarly, the reinforcement member 53 is formed so as to be less flexible in a release direction. Each reinforcement member 52, 53 may be subject to being released from the corresponding recess 17, 18 when bending in the release direction. Thus, excessive rising of each of the second stitched portions 35A, 36A from the corresponding recess 17, 18 can be avoided. Furthermore, each of the reinforcement members 52, 53 is formed so as to be more flexible in the width direction of the corresponding recess 17, 18. Thus, the reinforcement members 52, 53 can follow the deformation, such as stretch and compression, of the cushion cover 4S more smoothly. This contributes to improved aesthetics of the cushion cover 4S. The vertical dimension L4 of each reinforcement member 52, 53 is set greater than the width L3, which allows adjustment of the relative flexibility in different directions. Also in this embodiment, each of the reinforcement members 52, 53 is arranged so as to overlap the cover-side engaging member 40A of the corresponding first stitched portion 34A, 37A. By this arrangement, each of the second stitched portions 35A, 36A can be disposed within the corresponding recess 17, 18 with a similar alignment as the adjacent first stitched portion 34A, 37A. In this embodiment, portions of the stitching margin M3, M4 can be kept upstanding within the corresponding recess 17, 18 (e.g., along the depth direction) due to the fixing force of the cover-side engaging member 40A and the pad-side engaging member 20A. Furthermore in this embodiment, since each of the overlapping portions 52A, 53A of the corresponding reinforcement member 52, 53 is each arranged so as to overlap a portion of the cover-side engaging member 40A on a side of the stitching margin M1, stitching margin M1 attached to the reinforcement members 52, 53 can be kept more stably maintained in the upstanding state. According to this embodiment, even with a stitched part having no cover-side engaging member 40A, for instance the right-side second stitched portion 35A and the left-side second stitched portion 36A, the cushion cover 4S can be arranged on the cushion pad 4P in an aesthetic manner.

First Modified Embodiment

Figure 20:
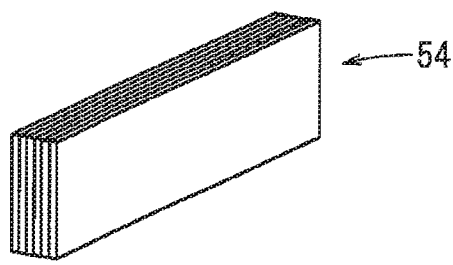
FIG. 20 is a perspective view of a reinforcement member of a first modified embodiment.

The reinforcement member is not limited to the above-mentioned configuration and various configurations may be applicable. As illustrated in FIG. 20, for example, the reinforcement member 54 is different from the reinforcement member of the first embodiment in that it has a layered configuration, while maintaining the same external shape. This reinforcement member 54 may be formed by layering plural plate members, in which the layers may be made of the same or different materials. According to this modified embodiment, the bending property of the reinforcement member 54 can be adjusted by changing the number of layers. For example, the rigidity of the reinforcement member 54 may be improved by increasing the number of layers. On the other hand, the flexibility of the reinforcement member 54 in the width direction of the recess may be improved by decreasing the number of layers.

Second Modified Embodiment

Figure 21:
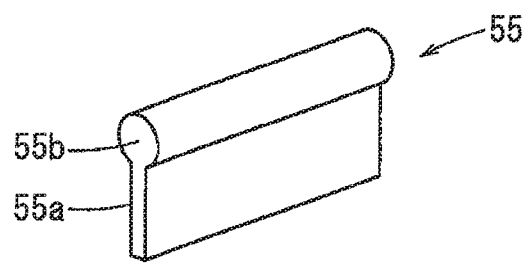
FIG. 21 is a perspective view of a reinforcement member of a second modified embodiment.

As illustrated in FIG. 21, a reinforcement member 55 may have a base portion 55a and a head portion 55b positioned at the end of the base portion 55a. The head portion 55b may have a substantially circular cross section and may be thicker than the base portion 55a. This thicker head portion 55b may be formed so as to continue along the longitudinal direction of the reinforcement member 55, thereby improving the rigidity of the reinforcement member 55. Since the base portion 55a is to be attached to the second stitched portion, it may be formed in a thinner manner. Such a thinner base portion 55a allows the reinforcement member 55 to follow the stretch and compression (deformation) of the seat cover across the surface of the seat cover more smoothly. The reinforcement member 55 may be attached to the corresponding second stitched portion with its head portion 55b positioned either within or outside of the recess. For example, in case where the head portion 55b is positioned outside the recess, the seat cover may be arranged such that a portion thereof wraps the head portion 55b. Thereby this portion of the seat cover may be allowed to protrude above the other portions of the seat cover, while still following the structural feature of the head portion 55b. The protruding portion of the seat cover provides rimmed appearance for the stitched portion of adjacent cover pieces (inside stitch portion), thereby improving the aesthetics of the seat cover. On the other hand, in case where the head portion 55b is positioned within a recess, the head portion 55b may be pushed into the recess so that it contacts the side walls of the recess. The friction force aids with maintaining the positioning of these stitched portions.

Third Modified Embodiment

Figure 22:
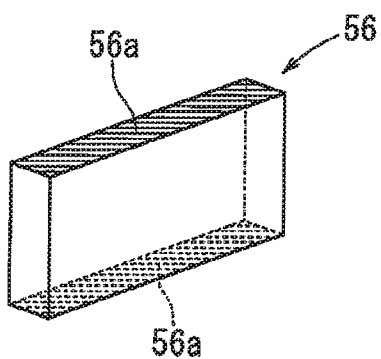
FIG. 22 is a perspective view of a reinforcement member of a third modified embodiment.

As illustrated in FIG. 22, a reinforcement member 56 according to the third modified embodiment may have a similar external shape as the reinforcement member of the first and second embodiments. However, the faces, the short sides, may have a resin coating layer 56a applied thereto that is less flexible than the seat cover. These resin coating layers 56a can enhance the rigidity of the reinforcement member 56. The resin coating layers eliminate the need to select a material that by itself has enough rigidity for the reinforcement member. Thereby, various other materials may be selected.

Fourth Modified Embodiment

Figure 23:
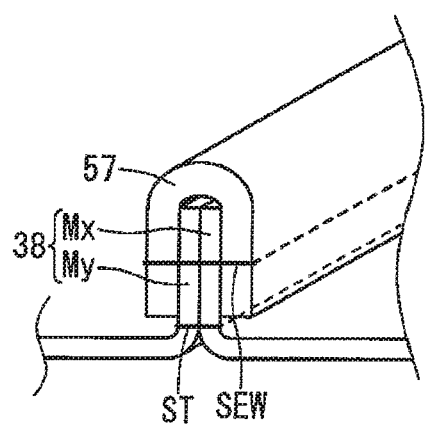
FIG. 23 is a perspective view of a reinforcement member of a fourth modified embodiment attached to the seat cover.

The reinforcement member 57 depicted in FIG. 23 is a plate member that curves to form a U-shape. The reinforcement member 57 may be attached to stitching margins Mx, My of the second stitched portion 38 so as to cover the distal ends of the stitching margins Mx, My. As described above, the reinforcement member 57 has a curved portion and is double-layered. Both of these features enhance the rigidity. Additionally, excessive bending or misalignment of the seat cover may be avoided. Furthermore, the stitching margins Mx, My are wrapped by the reinforcement member 57 in upstanding state. This contributes to enhancing the aesthetics of the seat.

Fifth Modified Embodiment

Figure 24:
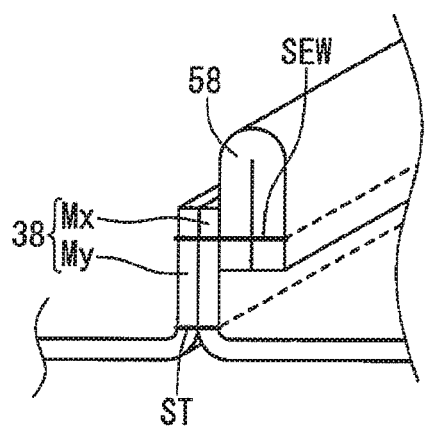
FIG. 24 is a perspective view of a reinforcement member of a fifth modified embodiment attached to the seat cover.

The reinforcement member 58 of the fifth embodiment, as illustrated in FIG. 24, is also a plate member that curves to form a U-shape. The reinforcement member 58 may be attached so as to contact only one stitching margin Mx of the second stitched portion 37.
The reinforcement member 58 is attached to the stitching margin Mx while in an upstanding state. This attachment of reinforcement member 58 allows the stitching margin Mx to more stably maintain an upstanding positioning, which may contribute to enhancing the aesthetics of the seat.

The conveyance seats of the present disclosure are not limited to previously mentioned embodiments, and rather may take various other embodiments. In the previously mentioned embodiments, the configurations of the first stitched portion and the second stitched portion are mentioned in terms of structure, dimension, and quantity, for example. However, each stitched portion is not intended to be limited to these configurations. For example, the first stitched portion and the second stitched portion may each be formed on any appropriate portion of the seat cover, taking into consideration the thickness of the seat pad. It is noted that the position of a thinner portion of the seat pad may be adjusted appropriately. Another example of a reason of omitting the pad-side engaging member includes a shortage of a space due to the positional relationship with other member(s).

In the previously mentioned embodiment, although configurations of the reinforcement member, in terms such as shape, dimension, arranged position, and quantity, are exemplified, the reinforcement member is not intended to be limited to these configurations. For example, a cross section of the reinforcement member may be selected from various shapes, such as substantially rectangular shapes or substantially circular shapes including ovals and circles. In attaching the reinforcement member to form the overlapping portion, the overlapping portion may be attached to the first stitched portion by stitching, for example. Alternatively, the overlapping portion may be merely arranged so as to be along the first stitched portion. The flexibility of the reinforcement member may be different in the direction toward which the reinforcement member releases from the recess and the direction corresponding to the width of the recess. Alternatively, the reinforcement member may have the same rigidity in both these directions. The reinforcement member may be attached to either side of the stitched portion. Accordingly, it is possible to attach the reinforcement member on the same side as that to which the cover-side fixing member is attached. The configuration of the reinforcement member of each embodiment may be combined and employed appropriately. Various methods for attaching the reinforcement member to the second stitched portion may be used, for example stitching, adhering, fusion-bonding, and bonding by means of a bonding member such a staple, or clip. The reinforcement member may include a facilitating portion that facilitates bending in the direction corresponding to the width of the recess. Examples of the facilitating portion may include a notch, a slit, and a weaker portion such as a thinner portion. Notches may be formed on the reinforcement member at an appropriate interval along the longitudinal direction, for example. This may facilitate bending of the reinforcement member in the width direction of the recess.

In the previously mentioned embodiments, although configurations of each of the pad-side engaging member and the cover-side engaging member, such as in terms of shape, dimension, arranged position, and quantity, are exemplified, these members are not intended to be limited to these respective configurations. The pad-side engaging member and the cover-side engaging member may each have any configuration as long as these members engage each other. For example, a wire, such as an insert wire, may be employed as the pad-side engaging member and fixing may be achieved by hog-ring fixing Alternatively, the cover-side engaging member may have a shape that has an arrow-head or hook cross-sectional shape.

In the previously mentioned embodiments, although a seat back 6 and seat cushion 4A are exemplified, configurations of the above-mentioned embodiments may be applied to other seat components, including an arm rest and a head rest. Configurations of a seat pad and a seat cover may be modified depending on seat component which the configurations of the above-mentioned embodiments are to be applied. Configurations of the conveyance seat may be also modified. The configurations of these embodiments are applicable to general conveyances including vehicles, aircrafts, trains, and ships.

The invention claimed is:

1. A conveyance seat, comprising:
   a seat pad;
   a first recess and a second recess formed in the seat pad, the first recess having a pad-side engaging member disposed therein, and the second recess having no pad-side engaging member disposed therein;
   a seat cover configured to cover the seat pad, the seat cover including a plurality of cover pieces;
   a first stitched portion and a second stitched portion projecting from the seat cover where adjacent cover pieces meet, the first stitched portion having a cover-side engaging member configured to engage the pad-side engaging member, and the second stitched portion having no cover-side engaging member and intersecting with the first stitched portion at an intersection point; and
   a reinforcement member attached to the second stitched portion and bestriding the intersection point,
   wherein an overlapping portion of the reinforcement member overlaps a portion of the cover-side engaging member in a width direction of the reinforcement member.

2. The conveyance seat according to claim 1, wherein the reinforcement member is less flexible in a length direction than a width direction perpendicular to the length direction.

3. The conveyance seat according to claim 1, wherein the reinforcement member is longer in a length direction than in a width direction perpendicular to the length direction.

4. The conveyance seat according to claim 1, wherein the cover-side engaging member is attached to a side of the first stitched portion opposite the overlapping portion.

5. The conveyance seat according to claim 1, wherein the reinforcement member has less flexibility than the seat cover.

6. The conveyance seat according to claim 1, wherein the first stitched portion includes a third stitched portion extending from the intersection point in a width direction so as to form a T-shape.

7. The conveyance seat according to claim 1, wherein:
   the first stitched portion comprises a plurality of first stitched portions; and the intersection point comprises a plurality of intersection points; and
   the second stitched portion intersects the plurality of the first stitched portions.

8. The conveyance seat according to claim 1, wherein:
   the second stitched portion comprises a first stitching margin and a second stitching margin that is thinner than the first stitching margin; and
   the reinforcement member is attached to the second stitching margin.

9. A conveyance seat, comprising:
   a seat pad;
   a first recess and a second recess formed in the seat pad, the first recess having a pad-side engaging member disposed therein, and the second recess having no pad-side engaging member disposed therein;
   a seat cover configured to cover the seat pad, the seat cover including a plurality of cover pieces;
   a first stitched portion and a second stitched portion projecting from the seat cover where adjacent cover pieces meet, the first stitched portion having a cover-side engaging member configured to engage the pad-side engaging member, and the second stitched portion having no cover-side engaging member and intersecting with the first stitched portion at an intersection point; and
a reinforcement member attached to the second stitched portion and bestriding the intersection point, wherein the first stitched portion is accommodated within the first recess, the second stitched portion is accommodated within the second recess, and a first portion of the reinforcement member is accommodated in the second recess.

10. The conveyance seat according to claim 9, wherein a second portion of the reinforcement member is accommodated within the first recess.

11. A seat cover for a conveyance seat, comprising:
a first stitching margin extending from a first cover piece;
a second stitching margin extending from a second cover piece, the second stitching margin positioned adjacent to the first margin beginning at a first intersection point;
a cover-side engaging member attached to the first stitching margin on a first side of the first intersection point; and
a reinforcement member attached to the first stitching margin on a second side of the first intersection point,
wherein the reinforcement member is further attached to the first stitching margin on the first side of the first intersection point.

12. The seat cover according to claim 11, wherein the reinforcement member is attached to the cover-side engaging member.

13. The seat cover according to claim 11, wherein a portion of the second stitching margin adjacent to the first stitching margin is not attached to a second cover-side engaging member.

14. The seat cover according to claim 11, wherein the reinforcement member has a greater flexibility in a direction in which the first and second stitching margins are adjacent to each other than in a direction perpendicular to the direction in which the first and second stitching margins are adjacent to each other.

15. The seat cover according to claim 11, further comprising:
a third stitching margin extending from a third cover piece, the third stitching margin positioned adjacent to the second stitching margin beginning at a second intersection point,
wherein the reinforcement member bestrides the second intersection point.

16. The seat cover according to claim 15, wherein the reinforcement member traverses a portion of the second stitching margin between the first and second intersection points.

17. A seat cover for a conveyance seat, comprising:
a first stitching margin extending from a first cover piece;
a second stitching margin extending from a second cover piece, the second stitching margin positioned adjacent to the first stitching margin;
a third stitched margin extending from a third cover piece, the third stitching margin positioned adjacent to the second stitching margin beginning at the intersection point;
a first stitched portion extending from the intersection point, the first cover piece, and the third cover piece;
a cover-side engaging member attached to the first stitched portion; and
a reinforcement member attached the second stitching margin and bestriding the intersection point.

* * * * *